US006599997B2

United States Patent
Araki et al.

(10) Patent No.: US 6,599,997 B2
(45) Date of Patent: *Jul. 29, 2003

(54) FLUORINE-CONTAINING ADHESIVE AND ADHESIVE FILM AND LAMINATED ARTICLE MADE BY USING SAME

(75) Inventors: Takayuki Araki, Settsu (JP); Shigehito Sagisaka, Settsu (JP); Yoshito Tanaka, Settsu (JP); Masahiro Kumegawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/189,415

(22) Filed: Jul. 8, 2002

(65) Prior Publication Data

US 2003/0026996 A1 Feb. 6, 2003

Related U.S. Application Data

(63) Continuation of application No. 09/425,000, filed as application No. PCT/JP98/02469 on Jun. 4, 1998, now Pat. No. 6,479,161.

(30) Foreign Application Priority Data

Jun. 6, 1997 (JP) ............................................. 9-149699

(51) Int. Cl.$^7$ ...................... C08F 214/18; C08F 214/24; C08F 214/26; B32B 27/04
(52) U.S. Cl. ...................... 526/242; 526/250; 526/255; 526/317.1; 428/500; 428/515
(58) Field of Search ............................. 526/242, 317.1, 526/255, 250; 428/515, 500

(56) References Cited

U.S. PATENT DOCUMENTS

| | | |
|---|---|---|
| 2,789,099 A | 4/1957 | Rife et al. |
| 2,957,931 A | 10/1960 | Hamilton et al. |
| 4,166,165 A | 8/1979 | Hisasue et al. |
| 4,243,504 A | 1/1981 | Fang |
| 4,341,685 A | 7/1982 | Miyake et al. |
| 4,348,310 A | 9/1982 | Silva et al. |
| 4,544,720 A | 10/1985 | Ohmori et al. |
| 4,581,412 A | 4/1986 | Ohmori et al. |
| 4,621,127 A | 11/1986 | Danzinger et al. |
| 4,677,017 A | 6/1987 | DeAntonis |
| 4,916,020 A | 4/1990 | Golding |
| 5,077,361 A | 12/1991 | Hughes et al. |
| 5,185,413 A | 2/1993 | Yoshinaga et al. |
| 5,216,099 A | 6/1993 | Hughes et al. |
| 5,294,686 A | 3/1994 | Fiarman et al. |
| 5,570,593 A | 11/1996 | Neher et al. |
| 5,670,593 A | 9/1997 | Araki et al. |
| 5,736,610 A | 4/1998 | Nishi et al. |
| 5,750,626 A | 5/1998 | Shimizu et al. |
| 5,780,552 A | 7/1998 | Kerbow |
| 5,869,574 A | 2/1999 | Shimizu et al. |
| 5,874,035 A | 2/1999 | Tsai |
| 5,965,275 A | 10/1999 | Nishi et al. |
| 5,986,150 A | 11/1999 | Araki et al. |
| 6,054,537 A | 4/2000 | Shimizu et al. |
| 6,069,215 A | 5/2000 | Araki et al. |
| 6,096,428 A | 8/2000 | Jing et al. |
| 6,107,422 A | 8/2000 | Wheland |
| 6,225,399 B1 | 5/2001 | Araki et al. |

FOREIGN PATENT DOCUMENTS

| | | |
|---|---|---|
| DE | 36 03 392 | 8/1987 |
| EP | 0 135 917 A2 | 4/1985 |
| EP | 0 398 653 | 11/1990 |
| EP | 05 10831 | 10/1992 |
| EP | 0 728 776 A1 | 8/1996 |
| GB | 05 78849 | 7/1946 |
| JP | 49 08672 | 7/1974 |
| JP | 53 127 586 | 11/1978 |
| JP | 2 34694 | 2/1990 |
| JP | 3-213336 | 9/1991 |
| JP | 3-234753 | 10/1991 |
| JP | 4-33904 | 2/1992 |
| JP | 5-261856 | 10/1993 |
| JP | 7-228848 | 8/1995 |
| JP | 9-157578 | 6/1997 |
| JP | 10-278193 | 10/1998 |
| JP | 10-329281 | 12/1998 |
| JP | 10-329282 | 12/1998 |
| WO | 95/33782 | 12/1995 |
| WO | 98/50229 | 11/1998 |

*Primary Examiner*—Fred Zitomer
(74) *Attorney, Agent, or Firm*—Sughrue Mion, PLLC

(57) ABSTRACT

A fluorine-containing adhesive comprising a fluorine-containing ethylenic polymer (A) having functional group which has a crystalline melting point or glass transition temperature of not more than 270° C. and is prepared by copolymerizing (a) 0.05 to 30% by mole of at least one of fluorine-containing ethylenic monomers having at least one functional group selected from the group consisting of carboxyl and a carboxylic salt group and (b) 70 to 99.95% by mole of at least one of fluorine-containing ethylenic monomers which do not have the above-mentioned functional group and is copolymerizable with the component (a). To provide the fluorine-containing adhesive maintaining chemical resistance, solvent resistance, weather resistance and stain-proofing property and giving direct strong adhesion particularly to a substrate of metal, glass, resin, etc. and an adhesive film and laminated article which are produced from the fluorine-containing adhesive.

16 Claims, 4 Drawing Sheets

FLUORINE-CONTAINING ADHESIVE AND ADHESIVE FILM AND LAMINATED ARTICLE MADE BY USING SAME

This is a continuation of application Ser. No. 09/425,000 filed Dec. 3, 1999 now U.S. Pat. No. 6,479,161, which is a 371 of PCT/JP98/02469 filed Jun. 4, 1998; the disclosure of which is incorporated herein by reference.

TECHNICAL FIELD

The present invention relates to a fluorine-containing adhesive which can adhere strongly to a substrate of various inorganic materials or organic materials, particularly to the fluorine-containing adhesive suitable for adhering by thermo-melting. The present invention further relates to a molded article and laminated article which are made by using the fluorine-containing adhesive.

BACKGROUND ART

Fluorine-containing polymers have been used for various applications since they are excellent in heat resistance, chemical resistance, weather resistance, surface characteristics (friction resistance, etc.) and electric insulating property.

On the contrary, fluorine-containing polymers are generally insufficient in mechanical strength and dimensional stability, and high in price.

In order to minimize those disadvantages and make the best use of the merits of the fluorine-containing polymer, investigations have been made also with respect to adhesion of a fluorine-containing polymer to other inorganic material or adhesion or lamination to organic material.

However the fluorine-containing polymer inherently has low adhesive force, and it is difficult to adhere the fluorine-containing polymer directly to other material (substrate). Even if the adhering is tried by thermo-processing, adhesive strength of the fluorine-containing polymer is not enough, or even if the polymer has adhesive force to a certain extent, such an adhesive force is apt to vary depending on kind of the substrate. Thus in many cases, reliability on the adhesive strength of the fluorine-containing polymer has been not so enough.

In order to adhere the fluorine-containing polymer to other material, mainly the following methods have been studied:

1. a method for physically roughening a surface of substrate by sand blasting, etc.,
2. a method for surface-treating a fluorine-containing polymer by sodium etching, plasma treatment, photochemical treatment, etc.,
3. a method for adhering by using an adhesive, and other methods.

With respect to the methods 1 and 2 above, surface-treating steps are required, and the steps are complicated and productivity is poor. Also kinds and shapes of substrates are restricted. Further the obtained adhesive force is insufficient, and there easily occur problems with appearance of the obtained laminated article (coloring and flaw).

Use of an adhesive in the method 3 above has also been discussed. A usual hydrocarbon type adhesive does not have enough adhesive property and its heat resistance is insufficient. Thus a hydrocarbon type adhesive cannot stand under conditions for adhering of a fluorine-containing polymer which requires molding and processing at high temperature, and peeling due to decomposition of the adhesive and coloring occur. Since the laminated article made by using the adhesive also is insufficient in heat resistance, chemical resistance and water resistance of its adhesive layer, it cannot maintain adhesive force due to a change in temperature and environment, and lacks in reliability.

On the contrary, adhesion by using an adhesive composition comprising a fluorine-containing polymer having functional group is discussed.

For example, it is reported that a fluorine-containing polymer prepared by graft-polymerizing, to the fluorine-containing polymer, a hydrocarbon monomer which has carboxyl represented by maleic anhydride and vinyltrimethoxysilane, a residual group of carbonic acid, epoxy or a hydrolyzable silyl group, is used as an adhesive (for example, JP-A-7-18035, JP-A-7-25952, JP-A-7-25954, JP-A-7-173230, JP-A-7-173446, JP-A-7-173447) and that an adhesive composition comprising a fluorine-containing copolymer prepared by copolymerizing a hydrocarbon monomer having functional group such as hydroxyalkyl vinyl ether with tetrafluoroethylene or chlorotrifluoroethylene and an isocyanate hardening agent is cured and used as an adhesive between vinyl chloride resin and corona-discharged ETFE (for example, JP-A-7-228848).

The above-mentioned adhesive composition comprising a fluorine-containing polymer prepared by graft-polymerizing or copolymerizing a hydrocarbon monomer having functional group does not have enough heat resistance, and thus at the time of processing a laminated article comprising the adhesive composition and a fluorine-containing resin at high temperature or during use at high temperature, decomposition and foaming occur, thereby causing reduction of adhesive strength, peeling and coloring. In case of the adhesive composition disclosed in JP-A-7-228848, it is necessary to corona-discharge the fluorine-containing resin.

Also it is reported that a fluorine-containing polymer having functional group which is prepared by copolymerizing a perfluoro(vinyl ether) compound containing carboxylic acid or its derivative with a fluorine-containing monomer is used for an adhesive composition. U.S. Pat. No. 4,916,020 describes a laminated article produced by using a fluorine-containing polymer having functional group which is introduced by copolymerizing perfluoro(vinyl ether) having a carboxylic acid group or its derivative with tetrafluoroethylene.

That laminated article is one made by laminating the above-mentioned fluorine-containing polymer having a carboxylic acid group or the like to a metal or other substrate through a layer of an adhesive resin such as epoxy resin or urethane resin but not directly to a metal, glass or other resin. Therefore there is a problem with heat resistance, chemical resistance and solvent resistance of epoxy resin and urethane resin during use. If the lamination is carried out through epoxy resin or urethane resin, adhering is possible, but no method of directly adhering to a metal, glass or other resin is disclosed.

An object of the present invention is to solve the above-mentioned problems and provide a fluorine-containing adhesive which can give strong adhesion directly to metal, glass and resin substrates while maintaining excellent characteristics of a fluorine-containing polymer such as chemical resistance, solvent resistance, weather resistance and stain-proofing property and also to provide an adhesive film and a laminated article which are made by using the fluorine-containing adhesive. Further an object of the present invention is particularly to provide the fluorine-containing adhesive which can adhere to the above-mentioned substrates strongly through a step of adhering by thermo-melting and to provide the laminated article produced by using the fluorine-containing adhesive.

DISCLOSURE OF THE INVENTION

The present invention relates to a fluorine-containing adhesive comprising (A) a fluorine-containing ethylenic polymer having functional group which has a crystalline melting point or glass transition temperature of not more than 270° C. and is prepared by copolymerizing:

(a) 0.05 to 30% by mole of at least one of fluorine-containing ethylenic monomers having at least one functional group selected from the group consisting of carboxyl and a carboxylic salt group and (b) 70 to 99.95% by mole of at least one of fluorine-containing ethylenic monomers having no functional group mentioned above and copolymerizable with the component (a).

It is preferable that the fluorine-containing ethylenic monomer (a) having functional group is at least one of monomers which are represented by the formula (1):

$$CX_2=CX^1-R_f-COOY \qquad (1)$$

wherein X and $X^1$ are the same or different and each is hydrogen atom or fluorine atom, Y is hydrogen atom, $NH_4$ or metal atom selected from elements of I, II, III, IVa and VIII groups, $R_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

Further it is preferable that the fluorine-containing ethylenic monomer (b) which does not have the above-mentioned functional group is a monomer mixture of 40 to 80% by mole of tetrafluoroethylene or chlorotrifluoroethylene, 20 to 60% by mole of ethylene and 0 to 15% by mole of a monomer copolymerizable with those monomers.

Further it is preferable that the fluorine-containing ethylenic monomer (b) which does not have the above-mentioned functional group is vinylidene fluoride.

Further it is preferable that the fluorine-containing ethylenic monomer (b) which does not have the above-mentioned functional group is a monomer mixture comprising 70 to 99% by mole of vinylidene fluoride and 1 to 30% by mole of tetrafluoroethylene, a monomer mixture comprising 50 to 99% by mole of vinylidene fluoride, 0 to 30% by mole of tetrafluoroethylene and 1 to 20% by mole of chlorotrifluoroethylene or a monomer mixture comprising 60 to 99% by mole of vinylidene fluoride, 0 to 30% by mole of tetrafluoroethylene and 1 to 10% by mole of hexafluoropropylene.

The present invention also relates to the molded article made by melt-molding the above-mentioned fluorine-containing adhesive.

The present invention also relates to the fluorine-containing adhesive film made by melt-molding the above-mentioned fluorine-containing adhesive.

The present invention also relates to the laminated article comprising:

(A-2) a layer of the above-mentioned fluorine-containing adhesive and (C-1) a layer of an inorganic material.

The present invention also relates to the laminated article comprising:

(A-3) a layer of the above-mentioned fluorine-containing adhesive and (D-1) a layer of an organic material.

It is preferable that the inorganic material (C-1) is a metallic material.

It is preferable that the inorganic material (C-1) is a non-metallic inorganic material.

It is preferable that the inorganic material (C-1) is a glass material.

It is preferable that the organic material (D-1) is a non-fluorine-containing polymer.

It is preferable that the organic material (D-1) is a thermoplastic resin.

It is preferable that the organic material (D-1) is polyamide.

The present invention also relates to a laminated tube made by molding the above-mentioned laminated article into the form of tube.

BEST MODE FOR CARRYING OUT THE INVENTION

Figure 1:
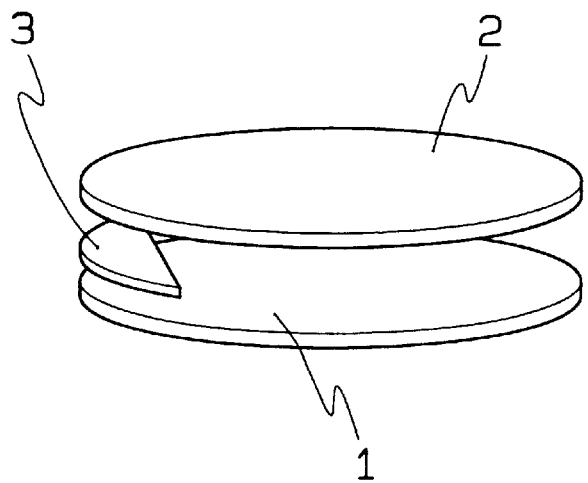
FIG. 1 is a diagrammatic view for explaining a method of making the laminated article for obtaining a test piece used in the peeling test in Example 1 of the present invention.

The fluorine-containing ethylenic polymer (A) used for the fluorine-containing adhesive of the present invention is a fluorine-containing ethylenic polymer containing carboxyl or a carboxylic salt group and having a crystalline melting point or glass transition temperature of not more than 270° C., particularly a fluorine-containing ethylenic polymer having a crystalline melting point or glass transition temperature of not more than 270° C. and prepared by copolymerizing:

(a) 0.05 to 30% by mole of at least one of fluorine-containing ethylenic monomers having at least one functional group selected from the group consisting of carboxyl and a carboxylic salt group and (b) 70 to 99.95% by mole of at least one of fluorine-containing ethylenic monomers having no functional group mentioned above and being copolymerizable with the component (a).

The present inventors have found that the above-mentioned fluorine-containing ethylenic polymer (A) has surprisingly strong adhesion to metal, synthetic resin and other substrates even without surface-treatment of the substrate and coating of an adhesive resin which are often conducted when a fluorine-containing resin is used, and that the polymer (A) has strong adhesion particularly when adhering by thermo-melting.

With respect to the fluorine-containing adhesive of the present invention, it, is important that the above-mentioned fluorine-containing ethylenic monomer (a) having either of carboxyl or a carboxylic salt group is copolymerized to introduce carboxyl or a carboxylic salt group into the fluorine-containing polymer and that a crystalline melting point or glass transition temperature of the obtained fluorine-containing polymer is not more than 270° C., thereby making it possible to give excellent adhesive force directly to surfaces of various materials, to which adhesion has been difficult or impossible, without surface-treatment of the substrate and coating of an adhesive resin. The polymer (A) is preferable from the points that the polymer (A) can be molded at relatively low temperature among usual fluorine-containing resins and can be adhered by thermo-melting at relatively low temperature. Thereby the maximum of adhesion to a substrate by introducing the above-mentioned functional group can be exhibited, and strong adhesion directly to a substrate is given by thermo-melting. Also the polymer (A) is preferable from the point of making it possible to laminate to an organic material having relatively low heat resistance. In the present invention it is possible to optionally select an adhesive having a crystalline melting point or glass transition temperature of not more than 270° C. The crystalline melting point or glass transition temperature is preferably not more than 250° C., further preferably not more than 230° C., particularly preferably not more than 200° C. Thus as mentioned above, adhesion to other material and laminating workability can be utilized more effectively.

The above-mentioned fluorine-containing polymer (A) having carboxyl or a carboxylic salt group and used for the fluorine-containing adhesive of the present invention can maintain excellent characteristics such as chemical resistance, weather resistance, stain-proofing property and non-sticking property of a fluorine-containing polymer and can give such excellent characteristics to a laminated article after adhering without lowering them.

Examples of the fluorine-containing ethylenic polymer (A) having carboxyl or a carboxylic salt group which is used for the adhesive of the present invention are fluorine-containing ethylenic polymers having a crystalline melting point or glass transition temperature of not more than 270° C. and prepared by copolymerizing:

(a) 0.05 to 30% by mole of at least one of monomers which are represented by the formula (1):

(1)

wherein X and $X^1$ are the same or different and each is hydrogen atom or fluorine atom, Y is hydrogen atom, $NH_4$ or metal atom selected from elements of I, II, III, IVa and VIII groups, $R_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms and (b) 70 to 99.95% by mole of at least one of fluorine-containing ethylenic monomers which do not have the above-mentioned functional group and are copolymerizable with the component (a).

The fluorine-containing polymer which is used for the adhesive of the present invention has a functional group represented by —COOY as shown in the formula (1), namely carboxyl or its ammonium salt, amine salt or metal salt or the like. Examples thereof are preferably —COOH, —COONH$_4$, —COONa, —COOK, —COOLi, —COOZn, —COOAl, —COOMg, —COOCa and the like.

The process for preparing the fluorine-containing polymer of the present invention is not limited as far as the polymer finally has a structure formed by copolymerizing the above-mentioned fluorine-containing ethylenic monomer (a) having functional group and the fluorine-containing ethylenic monomer (b). For example, the fluorine-containing polymer of the present invention having functional group of the present invention can be obtained by copolymerizing a fluorine-containing ethylenic monomer having a different functional group from that of the monomer (a) with the monomer (b) to give a fluorine-containing polymer having a different functional group from the present invention and then conducting highmolecular reaction. Concretely for example, after copolymerizing a fluorine-containing ethylenic monomer having a carboxylic ester group (—COOR, R: hydrocarbon group or the like) with the fluorine-containing monomer (b), the obtained polymer can be converted to the polymer of the present invention having carboxyl or a carboxylic salt group by hydrolysis. Also in order to obtain the fluorine-containing polymer having a carboxylic salt group of the present invention, it is possible to react the fluorine-containing polymer having carboxyl of the present invention with a metal compound such as a metal hydroxide corresponding to its salt or with ammonia. Further it is possible to obtain a fluorine-containing polymer having carboxyl by reacting a fluorine-containing polymer having a carboxylic salt group with acid (inorganic acid or the like).

Examples of the fluorine-containing ethylenic monomer (a) having functional group are one represented by the formula (2):

(2)

wherein Y is as defined in the above formula (1), $R_f^1$ is a divalent fluorine-containing alkylene group having 1 to 40 carbon atoms or —$OR_f^2$, in which $R_f^2$ is a divalent fluorine-containing alkylene group having 1 to 40 carbon atoms or a divalent fluorine-containing alkylene group having ether bond and 1 to 40 carbon atoms, one represented by the formula (3):

(3)

wherein Y is as defined in the above formula (1), —$R_f^3$ is a divalent fluorine-containing alkylene group having 1 to 39 carbon atoms or a divalent fluorine-containing alkylene group having ether bond and 1 to 39 carbon atoms, one represented by the formula (4):

(4)

wherein Y is as defined in the above formula (1), —$R_f^4$ is a divalent fluorine-containing alkylene group having 1 to 39 carbon atoms or —$OR_f^5$, in which $R_f^5$ is a divalent fluorine-containing alkylene group having 1 to 39 carbon atoms or a divalent fluorine-containing alkylene group having ether bond and 1 to 39 carbon atoms, one represented by the formula (5):

(5)

wherein Y is as defined in the above formula (1), $R_f^6$ is a divalent fluorine-containing alkylene group having 1 to 40 carbon atoms, or the like monomer.

From the viewpoint that copolymerizability with the fluorine-containing ethylenic monomer (b) is comparatively good and that heat resistance of the polymer obtained by copolymerizing is not lowered remarkably, the fluorine-containing ethylenic monomers having functional group and represented by the formulae (2) and (3) to (5) are preferable.

Among them, from the viewpoint of good copolymerizability with other fluorine-containing ethylenic monomer and heat resistance of the obtained polymer, the compounds of the formulae (2) and (4) are preferable, and the compound of the formula (4) is particularly preferable.

Examples of the fluorine-containing ethylenic monomer having functional group and represented by the formula (2) are:

$CF_2=CFOCF_2CF_2COOH$, $CF_2=CFO(CF_2)_3COOH$, $CF_2=CFOCF_2CFOCF_2CF_2COOH$,
　　　　　　$|$
　　　　　$CF_3$ $CF_2=CFOCF_2CFOCF_2CFOCF_2CF_2COOH$,
　　　　　　$|$　　　　$|$
　　　　　$CF_3$　　$CF_3$ $CF_2=CFCF_2COOH$, $CF_2=CFCF_2CF_2COOH$, $CF_2=CFOCF_2CF_2COONH_4$, $CF_2=CFO(CF_2)_3COONa$, $CF_2=CFOCF_2CFOCF_2CF_2COONH_4$,
　　　　　　$|$
　　　　　$CF_3$ $CF_2=CFOCF_2CFOCF_2CFOCF_2COONa$,
　　　　　　$|$　　　　$|$
　　　　　$CF_3$　　$CF_3$ $CF_2=CFCF_2COONH_4$, $CF_2=CFCF_2CF_2COOZn$, and the like.

Examples of the fluorine-containing ethylenic monomer having functional group and represented by the formula (3) are:

$CF_2=CFCF_2OCF_2CF_2CF_2COOH$, $CF_2=CFCF_2OCFCFCOOH$,
　　　　　　$|$
　　　　　$CF_3$ $CF_2=CFCF_2OCF_2CF_2CF_2COONH_4$, $CF_2=CFCF_2OCFCFCOONH_4$,
　　　　　　$|$
　　　　　$CF_3$ $CF_2=CFCF_2OCF_2CF_2CF_2COONa$, $CF_2=CFCF_2OCFCFCOOZn$,
　　　　　　$|$
　　　　　$CF_3$ and the like.

Examples of the fluorine-containing ethylenic monomer having functional group and represented by the formula (4) are:

$CH_2=CFCF_2CF_2CH_2COOH$, $CH_2=CFCF_2CF_2COOH$, $CH_2=CF(CF_2CF_2)_2CH_2COOH$, $CH_2=CFCF_2OCFCOOH$, $CH_2=CFCF_2OCFCF_2OCFCOOH$,
　　　　　　$|$　　　　　　　　　　　$|$　　$|$
　　　　　$CF_3$　　　　　　　　　$CF_3$ $CF_3$ $CH_2=CFCF_2CF_2CH_2COONH_4$, $CH_2=CFCF_2CF_2COONa$, $CH_2=CF(CF_2CF_2)_2CH_2COOZn$, $CH_2=CFCF_2OCFCOONH_4$,
　　　　　$|$
　　　　$CF_3$ $CH_2=CFCF_2OCFCF_2OCFCOONH_4$,
　　　　　$|$　　$|$
　　　　$CF_3$ $CF_3$ $CH_2=CFCF_2OCFCF_2OCFCOOZn$,
　　　　　$|$　　$|$
　　　　$CF_3$ $CF_3$ and the like.

Examples of the fluorine-containing ethylenic monomer having functional group and represented by the formula (5) are:

$CH_2=CHCF_2CF_2CH_2COOH$, $CH_2=CH(CF_2)_4CH_2CH_2COOH$, $CH_2=CH(CF_2)_6CH_2COOH$, $CH_2=CHCF_2CF_2CH_2COONH_4$, $CH_2=CH(CF_2)_4CH_2COONa$, $CH_2=CH(CF_2)_6CH_2COOZn$, and the like.

In the fluorine-containing polymer used for the adhesive of the present invention, the fluorine-containing ethylenic monomer (a) having functional group is copolymerized with the fluorine-containing ethylenic monomer (b) having no functional group mentioned above and being copolymerizable with the monomer (a).

By the copolymerization, the adhesive of the present invention itself can possess excellent heat resistance, chemical resistance, weather resistance, water resistance and electric insulating property of the fluorine-containing polymer, and the same excellent characteristics can be given to the laminated article produced by using the adhesive. Also the adhesive can have good adhesion to usual fluorine-containing polymer having no functional group.

The fluorine-containing ethylenic monomer (b) is substantially a fluorine-containing ethylenic monomer having no functional group mentioned above. Examples of the fluorine-containing ethylenic monomer (b) are, for instance, tetrafluoroethylene, chlorotrifluoroethylene, vinyl fluoride, vinylidene fluoride, hexafluoropropylene, hexafluoroisobutene, $CH_2=CF(CF_2)_nX$, $CH_2=CH(CF_2)_nX$, wherein X are hydrogen atom, chlorine atom or fluorine atom, n is an integer of 1 to 5, perfluoro(alkyl vinyl ethers) and the like.

The adhesive of the present invention comprises the fluorine-containing ethylenic monomer (a) having functional group and the fluorine-containing ethylenic monomer (b) having no functional group mentioned above as essential components, and further an ethylenic monomer having no fluorine atom can be copolymerized as an optional component.

It is preferable that the ethylenic monomer having no fluorine atom is selected from ethylenic monomers having not more than 5 carbon atoms in order not to lower heat resistance, chemical resistance, etc. Examples thereof are ethylene, propylene, 1-butene, 2-butene, vinyl chloride, vinylidene chloride, and the like.

A content of the fluorine-containing ethylenic monomer (a) having functional group in the fluorine-containing ethylenic polymer having functional group which is used for the fluorine-containing adhesive of the present invention is from 0.05 to 30% by mole on the basis of the total amount of monomers in the polymer.

Further the content of the fluorine-containing ethylenic monomer (a) having functional group is optionally selected depending on kind and shape of a substrate to be adhered, purpose of the adhering, application, required adhering force, form of adhesive, coating method, etc. The content of the fluorine-containing ethylenic monomer (a) having functional group is preferably from 0.05 to 20% by mole, particularly preferably from 0.1 to 10% by mole.

When the content of the fluorine-containing ethylenic monomer (a) having functional group is less than 0.05% by mole, sufficient adhesion to other substrate is difficult to obtain, and separation easily occurs due to temperature change and permeation of chemicals. When more than 30% by mole, heat resistance is lowered and there occur adhesion failure, coloring and foaming in processing at high temperature and separation, coloring, foaming and elution due to decomposition during use at high temperature.

In the fluorine-containing adhesive of the present invention, a crystalline melting point or glass transition temperature of the polymer can be adjusted to 270° C. or lower by selecting kind, combination and composition of the fluorine-containing ethylenic monomers (b), and the adhesive can be in either form of resin and elastomer. The form of the adhesive can be optionally selected depending on purpose and application of adhering, and purpose and application of a laminated article.

Examples of the preferred fluorine-containing ethylenic polymer (A) having functional group used for the fluorine-containing adhesive of the present invention are as follows.

(I) A copolymer comprising 0.05 to 30% by mole of the fluorine-containing ethylenic monomer (a) having functional group based on the total amount of monomers, and further based on the total amount of monomers excluding the monomer (a), 30 to 90% by mole of tetrafluoroethylene or chlorotrifluoroethylene, 10 to 70% by mole of ethylene and 0 to 40% by mole of other monomer copolymerizable therewith. Examples thereof are, for instance, ethylene-tetrafluoroethylene copolymer having functional group mentioned above (reactive ETFE) or ethylene-chlorotrifluoroethylene copolymer having functional group mentioned above (reactive ECTFE).

Examples of the other copolymerizable monomers used to obtain the reactive ETFE or reactive ECTFE are hexafluoropropylene, hexafluoroisobutene,

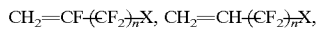

wherein X are H, Cl or F, n is an integer of 1 to 5, perfluoro(alkyl vinyl ethers) and the like.

Those fluorine-containing ethylenic polymers having functional group are preferred from the point that they are excellent particularly in heat resistance, chemical resistance, weather resistance, electric insulating property and non-sticking property. The above-mentioned fluorine-containing polymers (ETFE and ECTFE) having no functional group have the same excellent characteristics as mentioned above, but adhesion thereof to other material is low. Therefore improvement of adhesion has been demanded and lamination to other material has been desired. From that point of view, the above-mentioned fluorine-containing ethylenic polymers having functional group are preferred.

Further preferable are:

(I-1) a copolymer comprising 0.05 to 30% by mole of the fluorine-containing ethylenic monomer (a) having functional group based on the total amount of monomers, and further based on the total amount of monomers excluding the monomer (a), 62 to 80% by mole of tetrafluoroethylene, 20 to 38% by mole of ethylene and 0 to 10% by mole of other monomer, and (I-2) a copolymer comprising 0.05 to 30% by mole of the fluorine-containing ethylenic monomer (a) having functional group based on the total amount of monomers, and further based on the total amount of monomers excluding the monomer (a), 30 to 80% by mole of tetrafluoroethylene, 10 to 60% by mole of ethylene, 10 to 30% by mole of hexafluoropropylene and 0 to 10% by mole of other monomer. Those copolymers are preferred from the points that excellent characteristics of tetrafluoroethylene/ethylene copolymer can be maintained, a melting point thereof can be adjusted to be relatively low and the maximum of adhesion to other material can be exhibited.

Further examples of the preferred fluorine-containing copolymer (A) having functional group which is a component of the fluorine-containing adhesive of the present invention are:

(II) a copolymer comprising 0.05 to 30% by mole of the fluorine-containing ethylenic monomer (a) having functional group and 70 to 99.95% by mole of vinylidene fluoride (so-called polyvinylidene fluoride having functional group mentioned above (reactive PVdF)), (III) a copolymer comprising 0.05 to 30% by mole of the monomer (a) based on the total amount of monomers, and a monomer mixture comprising 50 to 99% by mole of vinylidene fluoride and 1 to 30% by mole of tetrafluoroethylene based on the total amount of monomers excluding the monomer (a), a monomer mixture comprising 60 to 99% by mole of vinylidene fluoride, 0 to 30% by mole of tetrafluoroethylene and 1 to 20% by mole of chlorotrifluoroethylene based on the total amount of monomers excluding the monomer (a), or a monomer mixture comprising 60 to 99% by mole of vinylidene fluoride, 0 to 30% by mole of tetrafluoroethylene and 1 to 10% by mole of hexafluoropropylene based on the total amount of monomers excluding the monomer (a) (reactive VdF copolymer), (IV) a copolymer comprising 0.05 to 30% by mole of the fluorine-containing ethylenic monomer (a) having functional group based on the total amount of monomers, and based on the total amount of monomers excluding the monomer (a), 15 to 60% by mole of vinylidene fluoride, 35 to 80% by mole of tetrafluoroethylene and 5 to 30% by mole of hexafluoropropylene, and the like.

Those fluorine-containing polymers (II), (III) and (IV) mainly comprising vinylidene fluoride are excellent in weather resistance, etc., can be molded and processed at low temperature and is soluble in a solvent, and therefore can be laminated to an organic material having not so high heat resistance. Thus those polymers are preferred ones.

Further there are:

(V) polymers having a crystalline melting point or glass transition temperature of not more than 270° C. and comprising 0.05 to 30% by mole of the fluorine-containing ethylenic monomer (a) having functional group based on the total amount of monomers, and further as monomers excluding the monomer (a), tetrafluoroethylene and a monomer represented by the formula (6):

wherein $R_f^7$ is selected from $CF_3$ and $OR_f^8$, in which $R_f^8$ is a perfluoroalkyl group having 1 to 5 carbon atoms, particularly (V-1) a copolymer comprising 0.05 to 30% by mole of the fluorine-containing ethylenic monomer (a) having functional group based on the total amount of monomers, and further as monomers excluding the monomer (a), 75 to 95% by mole of tetrafluoroethylene and 5 to 25% by mole of at least one monomer selected from the monomers represented by the formula (6).

Those polymers are also perfluoro copolymers and most excellent in heat resistance, chemical resistance, water repellency, non-sticking property, electric insulating property, and the like among fluorine-containing polymers.

Further examples of the fluorine-containing copolymer (A) having functional group which constitutes the fluorine-containing adhesive of the present invention in the form of elastomer are:

(VI) a copolymer comprising 0.05 to 30% by mole of the fluorine-containing ethylenic monomer (a) having functional group based on the total amount of monomers, and further based on the total amount of monomers excluding the monomer (a), 40 to 90% by mole of vinylidene fluoride, 0 to 30% by mole of tetrafluoroethylene and 10 to 50% by mole of hexafluoropropene.

(VII) a copolymer comprising 0.05 to 30% by mole of the monomer (a) based on the total amount of monomers, and further based on the total amount of monomers excluding the monomer (a), 40 to 70% by mole of tetrafluoroethylene, 30 to 60% by mole of propylene and 0 to 20% by mole of component copolymerizable therewith (for example, vinylidene fluoride, hexafluoropropylene, chlorotrifluoroethylene, perfluoro(vinyl ethers), and the like), (VIII) a copolymer containing tetrafluoroethylene and perfluoro(vinyl ether) which comprises 0.05 to 30% by mole of the monomer (a) based on the total amount of monomers, and further based on the total amount of monomers excluding the monomer (a), 40 to 85% by mole of tetrafluoroethylene and 15 to 60% by mole of perfluoro(vinyl ether), and the like.

The fluorine-containing ethylenic polymers (A) having functional group which constitutes the fluorine-containing adhesive of the present invention can be prepared by copolymerizing the fluorine-containing ethylenic monomer (a) having functional group and the fluorine-containing ethylenic monomer (b) having no functional group through known polymerization methods. Among them, radical copolymerization method is mainly used. Namely means for initiating the polymerization is not particularly limited if the polymerization advances radically. For example, the polymerization is initiated by an organic or inorganic radical polymerization initiator, heat, light, ionizing radiation, etc. The polymerization can be carried out by solution polymerization, bulk polymerization, suspension polymerization, emulsion polymerization, or the like. A molecular weight of the polymer is regulated by a concentration of the monomers used in the polymerization, a concentration of the initiator, a concentration of a chain transfer agent and polymerization temperature. Amounts of components of the prepared copolymer can be regulated by amounts of monomers used.

The fluorine-containing polymer of the present invention having functional group of the present invention can be obtained by copolymerizing a fluorine-containing ethylenic monomer having a different functional group from that of the monomer (a) with the monomer (b) to give a fluorine-containing polymer having a different functional group from the present invention and then conducting highmolecular reaction. Concretely for example, after copolymerizing the fluorine-containing ethylenic monomer (a) having a carboxylic ester group (—COOR, R: hydrocarbon group or the like) with the fluorine-containing monomer (b), an obtained polymer can be converted to the polymer of the present invention having carboxyl or a carboxylic salt group by hydrolysis. Also in order to obtain the fluorine-containing polymer having a carboxylic salt group of the present invention, it is possible to react the fluorine-containing polymer having carboxyl of the present invention with a metal compound such as a metal hydroxide corresponding to its salt or with ammonia. On the contrary, it is possible to obtain a fluorine-containing polymer having carboxyl by reacting a fluorine-containing polymer having a carboxylic salt group with acid (inorganic acid or the like).

Though it is preferable that the fluorine-containing adhesive of the present invention is used solely for adhering in order not to lower adhesion, heat resistance and chemical resistance thereof, to the adhesive can be added various fillers such as inorganic powder, glass fiber, carbon fiber, metal oxide and carbon depending on purpose and application in the range not lowering its characteristics. In addition to the fillers, pigment, ultraviolet ray absorbent and other optional additives can be mixed thereto. Further besides the additives, resins such as other fluorine-containing resin, thermoplastic resin and heat-curing resin and a synthetic rubber can be blended to make it possible to enhance mechanical properties, weather resistance and moldability, to give property for exhibiting clear surface pattern and to prevent occurrence of static electricity.

The fluorine-containing adhesive of the present invention can be used in various forms such as powder, pellets, pre-molded film or sheet, molded article, aqueous dispersion, organic solvent soluble material, or organic solvent dispersion.

The fluorine-containing adhesive processed to any of those various forms is contacted to other substrate and is subjected to treating under heating and pressing conditions, thereby forming good adhered state of the two substrates. A strong adhesive force of the fluorine-containing adhesive of the present invention can be obtained by contacting the adhesive to other substrate particularly under heating and pressing conditions.

Since the fluorine-containing adhesive of the present invention in the form of resin is melt-moldable and has good melt-moldability, it is used as a molding material and can be formed into a molded article by conventional molding methods such as injection molding, extrusion molding, co-extrusion molding, inflation molding, coating and insert molding employing a mold. Also it is possible to directly produce a laminated article in the form of film, sheet, tube, hose, etc. by co-extrusion molding. Further a laminated article can be produced by forming the adhesive into a film or sheet and then laminating the film or sheet to other substrate.

Also in case of the fluorine-containing adhesive of the present invention in the form of elastomer, it is possible to adhere the adhesive by vulcanizing by mixing a vulcanizing agent to the adhesive. Examples of the usable vulcanizing method are organic peroxide vulcanizing, polyol vulcanizing and amine vulcanizing which are usual vulcanizing methods for a fluorine-containing rubber. For example, in case of organic peroxide vulcanizing, in order to introduce cure site, a monomer containing bromine or iodine may be copolymerized with a fluorine-containing rubber or at the time of polymerization, a chain transfer agent containing iodine may be used. Also even if bromine or iodine is not used as cure site, there may be used, as a vulcanization accelerator, organic bases, i.e. organic onium compounds such as organic quaternary ammonium salt and organic quaternary phosphonium salt, nitrogen-containing organic compounds such as amine and imine and organic phosphoric compounds such as phosphine and phosphite. When introducing bromine or iodine as cure site, unsaturated polyfunctional compounds are used as a vulcanization accelerator. Also when the organic base is used as a vulcanization accelerator, a divalent metal oxide or hydroxide is used as an acid acceptor.

Examples of the organic peroxide to be used are benzoyl peroxide, dichlorobenzoyl peroxide, dicumyl peroxide, 2,5-dimethyl-2,5-di(peroxybenzoate)hexyne-3,1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenyl acetate, and the like. Examples of the unsaturated polyfunctional compound to be used are triallyl isocyanurate, triallyl cyanurate, trimethylolpropanetrimethacrylate, polybutadiene, and the like.

Examples of the organic base to be used are tetrabutylammonium hydrogen sulfate, tetrabutylammonium bromide, 8-benzyl-1,8-diazabicyclo[5.4.0]-7-undecenium chloride, p-toluenesulfonic acid 1,8-diazabicyclo[5.4.0]-7-undecenium, tetrabutylphosphonium chloride, trioctylmethylphosphonium chloride, triphenylbenzylphosphonium chloride, 1,8-diazabicyclo[5.4.0]-7-undecene, pyridine, tributylamine, triphenyl phosphine, tributyl phosphite, and the like.

In case of polyol vulcanizing, in which a polyhydroxyl compound is used as a vulcanization agent, an organic onium compound is used as a vulcanization accelerator and a divalent metal oxide or hydroxide is used as an acid acceptor. As the polyhydroxyl compound, all of known compounds used in the polyol vulcanizing for fluorine-containing rubbers can be used. Among them, aromatic polyhydroxyl compounds such as bisphenol AF, bisphenol A and hydroquinone are used preferably.

As the organic onium compound, all of known compounds used in the polyol vulcanizing for fluorine-containing rubbers can be used. Examples thereof are quaternary phosphonium salts such as triphenylbenzylphosphonium chloride and trioctylmethylphosphonium chloride, quaternary ammonium salts such as tetrabutylammonium bromide, tetrabutylammonium hydrogen sulfate and 8-benzyl-1,8-diazabicyclo[5.4.0]-7-undecenium chloride, iminium salt, sulfonium salt, and the like.

Also in case of the amine vulcanizing, in which a polyamine compound is used as a vulcanization agent, a divalent metal oxide or hydroxide is used as an acid acceptor. As the polyamine compound, all of known compounds used in the amine vulcanizing for fluorine-containing rubbers can be used. Examples thereof are hexamethylenediamine, hexamethylenediamine dicarbamate, dicinnamylidene hexamethylenediamine, and the like. As the acid acceptor, an oxide or hydroxide of magnesium, calcium, zinc, lead, or the like can be used.

The so-obtained fluorine-containing adhesive in the form of elastomer can be adhered or laminated to other organic or inorganic material by conventional methods such as extrusion, co-extrusion, calendering, coating and insert molding employing a mold. By those methods, there can be obtained, for example, a laminated film of two layers comprising the adhesive of the present invention in the form of elastomer and other polymer; a laminated article of three layers comprising the adhesive of the present invention in the form of elastomer as an adhesive layer and other polymer layers laminated on both sides of the adhesive layer; an inorganic material of metal, glass or ceramic coated with the adhesive of the present invention in the form of elastomer; an inorganic material of metal, glass or ceramic, to which other polymer is applied by using the adhesive of the present invention in the form of elastomer as an adhesive layer; and the like.

A variety of the above-mentioned fluorine-containing adhesives of the present invention can be also used for surface treating of a powder or as a coating composition.

For example, the fluorine-containing adhesive of the present invention can be used as a coating composition in the form of a powder, aqueous dispersion, organic solvent dispersion or organic solvent soluble material. The adhesive can be used as a primer for fluorine-containing coating composition by utilizing adhesive property to various substrates which a polymer to be used as an adhesive possesses.

The present invention also relates to the fluorine-containing adhesive film produced by molding the above-mentioned fluorine-containing adhesive (hereinafter also referred to as "adhesive film").

Hot-melt adhesives have been developed from the viewpoint of development of composite materials, rationalization and automation of adhering works and prevention of pollution. However usual hot-melt adhesives require use of an applicator. On the contrary, an adhesive in the form of film is advantageous from the viewpoint of processing since an applicator necessary for hot melt adhesives is not required, and the film can be adhered by thermo-compression bonding while being put on a substrate or inserted between substrates. Further since a uniform adhesive layer is formed on the whole surface of substrate, a film free from nonuniform adhesion and having uniform adhesive strength can be obtained, and thus can be also applied to a substrate having poor or no compatibility therewith. Further the film can be cut into various shapes, and thus is advantageous from the viewpoint of a small loss in processing work, good working environment and cost.

The adhesive film of the present invention possesses the same advantages as mentioned above.

The adhesive film of the present invention is a fluorine-containing adhesive film produced by molding the fluorine-containing ethylenic polymer which has a crystalline melting point or glass transition temperature of not more than 270° C. and is obtained by copolymerizing (a) 0.05 to 30% by mole of at least one of fluorine-containing ethylenic monomers having at least one functional group selected from carboxyl and a carboxylic salt group and (b) 70 to 99.95% by mole of at least one of fluorine-containing ethylenic monomers copolymerizable with the component (a).

The adhesive film can be adhered strongly directly to other various substrates by thermo-melting at relatively low temperature without surface treatment and use of usual adhesives, thereby giving excellent characteristics of the fluorine-containing polymer to substrates.

Though it is possible to produce the adhesive film by using an adhesive selected from the above-mentioned various fluorine-containing adhesives depending on application, purpose, film production process and adhering method, preferable are the fluorine-containing adhesive films produced by melt-molding the fluorine-containing adhesives obtained from any of the above-mentioned copolymers (I) to (V) since the adhesive films themselves have heat resistance, chemical resistance, mechanical properties and non-sticking property; effective film molding represented by melt-molding is possible; the polymers have good moldability at relatively low temperature among usual fluorine-containing resins and it is possible to make the film thin and uniform; and it is possible to melt by various thermo-compression bonding methods at relatively low temperature and adhere the film strongly and beautifully to various substrates.

The thickness of the fluorine-containing adhesive film of the present invention is selected depending on purpose and application and is not limited particularly. For example, the thickness is from 10 to 3,000 μm, preferably from 20 to 500 μm, particularly preferably from 40 to 300 μm.

In case of too thin films, special production method is required; it is difficult to handle the film at the time of adhering; wrinkling, breaking and poor appearance occur easily; and there is a case where adhesive strength, mechanical strength, chemical resistance and weather resistance become insufficient. Too thick film is disadvantageous from the viewpoint of cost and workability at the time of bonding to one unit.

Further the present invention relates to the fluorine-containing adhesive laminated film (hereinafter referred to as "adhesive laminated film") produced by laminating:

(A-1) a layer comprising the above-mentioned fluorine-containing adhesive, and (B-1) a layer comprising a fluorine-containing ethylenic polymer having no functional group on its side chain.

Namely one surface of the film is a layer which comprises a fluorine-containing ethylenic polymer having carboxyl or a carboxylic salt group and has adhesive property to a substrate, and another surface of the film is a layer comprising usual fluorine-containing polymer. By bringing the surface of the fluorine-containing adhesive into contact to the substrate and adhering it to the substrate by thermo-compression bonding, etc., excellent characteristics of the fluorine-containing polymer such as chemical resistance, weather resistance, stain-proofing property, non-sticking property, friction resistance and electrical properties can be given to the substrate or the laminated article including the substrate.

In the adhesive laminated film of the present invention which is produced by laminating the layers (A-1) and (B-1), though the fluorine-containing ethylenic polymer (B-1) having no functional group on its side chain can be selected from PTFE, PFA, FEP, ETFE, ECTFE, PVdF and vinylidene fluoride copolymer, it is preferable to select the polymer of the layer (B-1) from those having a crystalline melting point or glass transition temperature of not more than 270° C. in order to maintain and use good moldability and adhering workability of the adhesive laminated film of the present invention at the time of laminating the layers (A-1) and (B-1) or adhering to other material. That is preferable because excellent characteristics of the fluorine-containing polymer can be given to a substrate or a laminated article including the substrate.

Though various combinations of the two layers of the adhesive laminated article of the present invention can be selected depending on purpose, application and processing method, it is preferable to select good combination from the viewpoint of adhesion and compatibility to each other.

Concretely it is preferable to select the polymer of the layer (A-1) having adhesive property from the polymers which are obtained by copolymerizing the fluorine-containing ethylenic monomer (a) having functional group giving adhesive property with a monomer or monomers having monomer components similar to those of the fluorine-containing polymer of the layer (B-1).

Further concretely preferred are:

i) the fluorine-containing adhesive laminated film produced by laminating
  (A-1) a layer of an adhesive comprising the above-mentioned copolymer (I) (reactive ETFE) and
  (B-1) a layer of ETFE,
  which is preferable since the film has excellent heat resistance, chemical resistance, mechanical properties and melt-processability, ii) the fluorine-containing adhesive laminated film produced by laminating
  (A-1) a layer of an adhesive comprising the above-mentioned copolymer (II), (III) (reactive PVdF) or (IV) and
  (B-1) a layer comprising at least one polymer selected from the group consisting of PVdF and vinylidene fluoride copolymers,
  which is preferable since the film has excellent weather resistance and moldability, and iii) the fluorine-containing adhesive laminated film produced by laminating
  (A-1) a layer of an adhesive comprising the above-mentioned polymer (V) and
  (B-1) a layer comprising a polymer comprising 75 to 100% by mole of tetrafluoroethylene and 0 to 25% by mole of a monomer unit represented by the formula (6):

$$CF_2=CFR_f^7 \qquad (6)$$

wherein $R_f^7$ is $CF_3$ or $OR_f^8$, in which $R_f^8$ is a perfluoroalkyl group having 1 to 5 carbon atoms, which is preferable since the film has excellent heat resistance, chemical resistance, non-sticking property and water repellency.

In the present invention, a thickness of the adhesive laminated film comprising two layers is selected depending on application and purpose, and is not limited particularly. The total thickness of two layers is from 20 to 5,000 μm, preferably from 40 to 1,000 μm, particularly preferably from 50 to 500 μm.

A thickness of each layer which can be used is from 5 to 1,000 μm, preferably from 10 to 500 μm, particularly preferably from 10 to 200 μm of the adhesive layer (A-1), and from about 15 μm to about 4,995 μm, preferably from 30 to 990 μm, particularly preferably from 40 to 490 μm of the fluorine-containing polymer layer (B-1).

In the present invention, to the adhesive film or at least one layer of the adhesive laminated film can be optionally incorporated a proper reinforcing agent, filler, stabilizer, ultraviolet ray absorber, pigment, and other additives in an amount not lowering characteristics of the film. Those additives make it possible to improve thermal stability, surface hardness, abrasion resistance, weather resistance, electrostatic charge, etc.

The adhesive film of the present invention can be produced, depending on kind of polymers used and desired shape of the film, by various methods such as thermal melting method, extrusion method, cutting method, solvent-casting method and a method of applying a powder or an aqueous dispersion or organic solvent dispersion to form a continuous coating film.

For example, the fluorine-containing polymer having functional group of the present invention is an adhesive having good melt-moldability at relatively low temperature, and therefore compression molding, extrusion molding or the like is adopted, and melt-extrusion molding is particularly preferred from the viewpoint of productivity and product quality.

Bonding of the two layers (A-1) and (B-1) into one adhesive laminated film of the present invention can be carried out by a method of overlapping the respective molded laminating films (A-1) and (B-1) and then compression-molding; a method of applying one fluorine-containing polymer to a molded film comprising another fluorine-containing polymer; a method of carrying out film molding and bonding of films at the same time through multi-layer co-extrusion molding method, or the like method. Among them, the multi-layer co-extrusion molding method is preferred from the viewpoint of productivity and product quality.

Adhesion of the adhesive film and adhesive laminated film to other substrate is achieved through thermal activation by heating, etc. Further thermo-melting adhesion is preferable. Particularly the fluorine-containing adhesive of the present invention can exhibit a strong adhesive force to the substrate particularly at the time of thermo-melting adhesion. Represented examples of the adhering method are heating roller method and heat press method, and co-extrusion method in case where the substrate is a thermoplastic resin. Also there are other methods such as high-frequency heating, microwave heating, vacuum compression (vacuum press, etc.) and pneumatic press. Those methods can be optionally selected depending on kind and shape of a substrate, condition and kind of film, etc.

The adhesive film and adhesive laminated film of the present invention are formed into various shapes, sizes and thickness as mentioned above, and can be used in a wide range of applications because of excellent adhesion thereof to various substrates and excellent properties which a fluorine-containing polymer possesses. For example, the films are used in the form of tube for exterior and interior protection of metallic tube and bar, and in the form of plate, bent plate, curved plate, etc. Examples of application thereof are applications for imparting weather resistance such as a corrosion preventing tape to be wound on pipes of chemical plant, a corrosion preventing tape to be wound on a bottom of a can, a tape for preventing corrosion of pipes on a deck of ship, a corrosion preventing tape for other pipes, an advertising plate, a roof or side wall of greenhouse for agriculture or other purpose, an exterior material and a surface of solar battery, and also for applications to interior materials for giving excellent stain-proofing property. Further the films can be used for applications requiring chemical resistance such as packaging of foods and chemicals.

Also the adhesive film and adhesive laminated film of the present invention can be used for applications requiring non-sticking property and friction resistance such as fuser roller and pressing roller of a copying machine and printer, food processing machine and cooking apparatus, applications requiring electrical properties such as printed circuit board, application requiring water repellency such as water repellent glass, and in addition, for liquid crystal-related materials such as liquid crystal display and car-related materials.

Further the present invention relates to the laminated article produced by adhering the above-mentioned fluorine-containing adhesive and a substrate.

The adhesive of the present invention comprising the fluorine-containing polymer (A) having carboxyl or a carboxylic salt group has good adhesion directly to various inorganic and organic materials without surface treating of a substrate, and thus various laminated articles can be formed.

The first laminated article of the present invention (hereinafter referred to as "laminated article 1") is a laminated article comprising:

(A-2) the adhesive of fluorine-containing polymer (A) having carboxyl or a carboxylic salt group and (C-1) an inorganic material.

Examples of the inorganic material (C-1) are metallic material, non-metallic inorganic material, and the like.

The metallic materials encompass metal, alloys of two or more metals, metal oxide, metal hydroxide, metal salts such as carbonate and sulfate, etc. Among them, metal, metal oxide and alloys are more preferable from the viewpoint of adhesive property.

Examples of the metallic material (C-1) to be used for the laminated article of the present invention are metals and metal compounds of aluminum, iron, nickel, titanium, molybdenum, magnesium, manganese, copper, silver, lead, tin, chromium, beryllium, tungsten and cobalt, alloys of two or more thereof, etc. The metallic material can be selected depending on purpose and application.

Examples of the alloys are alloy steels such as carbon steel, Ni steel, Cr steel, Ni—Cr steel, Cr—Mo steel, stainless steel, silicon steel and Permalloy; aluminum alloys such as Al—Cl, Al—Mg, Al—Si, Al—Cu—Ni—Mg and Al—Si—Cu—Ni—Mg; copper alloys such as brass, bronze, silicon bronze, silicon brass, nickel silver and nickel bronze; nickel alloys such as nickel manganese (D nickel), nickel-aluminum (Z nickel), nickel-silicon, Monel metal, Constantan, nichrome Inconel and Hastelloy; and the like.

Also for the purpose of preventing corrosion of metal, a metal surface may be subjected to coating of other metal by electroplating, hot dipping, chromatizing, siliconizing, colorizing, sheradizing, metal spraying, etc.; forming a phosphate film by phosphatization; forming metal oxide by anodizing or heat-oxidizing; or electrochemical corrosion prevention.

Further for the purpose of enhancing adhesion, the surface of metal may be subjected to chemical preparation with a phosphoric acid, sulfuric acid, chromic acid, oxalic acid, etc., or may be subjected to surface roughening by sand blasting, shot blasting, grit blasting, honing, paper scratching, wire scratching, hair line finishing, etc. For the purpose of exhibiting clear surface pattern of the metal, the metal surface may be subjected to coloring, printing, etching, etc.

Preferred materials having good adhesion and required to be endowed with excellent functions by laminating the fluorine-containing polymer are aluminum-based metallic materials, iron-based metallic materials and copper-based metallic materials.

Examples of the non-metallic inorganic material are glass materials such as crystallized glass, foam glass, heat reflecting glass, heat absorbing glass and multi-layered glass; ceramic substrates such as tile, large size pottery plate, ceramic panel and brick; natural stones such as granite and marble; concrete substrates such as high strength concrete, glass fiber-reinforced concrete (GRC), carbon fiber-reinforced concrete (CFRC), lightweight aerated concrete (ALC) and composite ALC; cement substrates such as extrusion-molded cement and composite molded cement; asbestos slate; enameled steel plate; monocrystal silicon; polycrystal silicon; amorphous silicon; clay; boron-based material; carbon-based material; and the like. Among them, glass materials are preferred from the viewpoint of good adhesion and from a point that the glass materials are required to be endowed with more excellent functions by laminating the fluorine-containing polymer.

Examples of preferred combination of the fluorine-containing adhesive (A-2) and the inorganic material (C-1) in the laminated article 1 of the present invention are mentioned below.

i) A laminated article comprising:
   (A-2) fluorine-containing adhesive of any of the above-mentioned copolymers (I) to (V) and
   (C-1) aluminum-based metallic material.

In this case, as the aluminum-based metallic material, there can be used pure aluminum; aluminum oxide; and aluminum alloys for casting and expanding such as Al—Cu, Al—Si, Al—Mg, Al—Cu—Ni—Mg, Al—Si—Cu—Ni—Mg alloys, high tensile aluminum alloy and corrosion resistant aluminum alloy. Also in order to enhance corrosion resistance, surface hardness and adhesive property of the substrate, it is possible to form an oxide film (alumite) on the surface of the above-mentioned aluminum or aluminum alloy by anodizing with caustic soda, oxalic acid, sulfuric acid or chromic acid and also use the aluminum or aluminum alloy subjected to other surface treatments mentioned above.

ii) A laminated article comprising:
   (A-2) fluorine-containing adhesive of any of the above-mentioned copolymers (I) to (V) and
   (C-1) iron-based metallic material.

In this case, as the iron-based metallic material, there can be used pure iron, iron oxide, carbon steel, Ni steel, Cr steel, Ni—Cr steel, Cr—Mo steel, Ni—Cr—Mo steel, stainless steel, silicon steel, Permalloy, non-magnetic steel, magnet steel, cast iron, etc.

Further there can be used a material plated, on its surface, with other metal as mentioned above, for example, steel plate subjected to hot-dip zinc-plating, hot-dip zinc alloy plating, aluminum plating, zinc-nickel plating, zinc-aluminum plating, or the like; a material coated with other metal by diffusion coating or thermal spraying; a material, on which an oxide film is formed by chemical conversion treatment with chromic acid or phosphoric acid or heat-treatment; a material subjected to electric corrosion preventing treatment (for example, galvanized steel plate); or the like.

The laminated articles I) and ii) are preferred because corrosion resistance, rust preventing property, chemical resistance, weather resistance, non-sticking property and sliding property can be given to the aluminum-based material and iron-based material and they can be used for various applications such as building material, chemical plant, food processing, cooking apparatus, housing facilities and equipment, parts of domestic appliances, car-related parts, office automation-related parts, etc.

iii) A laminated article comprising:
   (A-2) fluorine-containing adhesive of the above-mentioned copolymer (I) or (V) and
   (C-1) copper-based metallic material.

This laminated article is preferable because it is low in water absorption, gives excellent electrical properties of fluorine-containing resin to copper-based material and can be used for applications in electric and electronic fields such as printed circuit board and electrical and electronic parts.

iv) A laminated article comprising:
   (A-2) fluorine-containing adhesive of any of the above-mentioned copolymers (I) to (V) and
   (C-1) glass material.

This laminated article has transparency, gives water repellency, oil repellency, reflection preventing property, low refraction coefficient to a surface of glass and can be used for optical parts, liquid crystal-related parts, glass for building, cooking apparatus made of glass, glass for cars, etc. Also this laminated article plays a part in preventing breakage of glass, and thus is preferably used for illumination-related appliances, non-flammable fire-proof safety glass, etc.

Further a fluorine-containing polymer having no functional group on its side chain can be laminated to the surface of the adhesive of the laminated article 1 of the present invention comprising the fluorine-containing adhesive (A-2) and inorganic material (C-1).

Namely a laminated article comprising:
   (A-4) the above-mentioned fluorine-containing adhesive,
   (B-2) a fluorine-containing polymer having no functional group on its side chain, and
   (C-2) an inorganic material,
in which the adhesive (A-4) is put between the polymer (B-2) and the inorganic material (C-2). Excellent characteristics of the fluorine-containing polymer can be given more effectively to the inorganic material.

In that case, it is preferable that the fluorine-containing adhesive (A-4) used for an adhesive layer of the laminated article 1 comprising the three layers is a polymer similar to the fluorine-containing polymer (B-2) and has carboxyl or a carboxylic salt group from the viewpoint of adhesion to each other. Examples of the laminated article are, for instance, i) a laminated article comprising:
   (A-4) a fluorine-containing adhesive of the above-mentioned copolymer (I),
   (B-2) ETFE and
   (C-2) an inorganic material, ii) a laminated article comprising:
   (A-4) a fluorine-containing adhesive of the above-mentioned copolymer (II), (III) or (IV),
   (B-2) a polymer selected from PVdF or VdF copolymers and
   (C-3) an inorganic material, and iii) a laminated article comprising:
   (A-4) a fluorine-containing adhesive of the above-mentioned copolymer (V),
   (B-3) a polymer comprising 75 to 100% by mole of tetrafluoroethylene and 0 to 25% by mole of the monomer represented by the formula (6) and
   (C-3) an inorganic material.

In the laminated article of the present invention having the inorganic material (C-1), proper additives such as reinforcing agent, filler, stabilizer, ultraviolet ray absorber and pigment can be optionally contained in the fluorine-containing adhesive layer (A-2) and fluorine-containing polymer layer (B-2) in the range not lowering adhesion and other characteristics of the fluorine-containing polymer. By blending such additives, it is possible to improve thermal stability, surface hardness, abrasion resistance, weather resistance, electrostatic charge and other properties.

The second laminated article of the present invention (hereinafter referred to as "laminated article 2") is a laminated article comprising:
   (A-3) the above-mentioned fluorine-containing adhesive and
   (D-1) an organic material excluding the fluorine-containing polymer.

Namely the fluorine-containing adhesive (A-3) of the present invention exhibits good adhesion also to an organic material other than a fluorine-containing polymer by an effect of carboxyl or a carboxylic salt group contained in the adhesive (A-3).

Examples of the organic material used in the laminated article 2 of the present invention are high molecular synthetic materials such as synthetic resin, synthetic rubber, synthetic fiber and synthetic leather, natural organic materials such as natural rubber, natural fiber, wood, paper and leather and composite materials thereof.

Among them, non-fluorine-containing polymer materials are preferred because when laminated to a fluorine-containing polymer, both polymers compensate for disadvantages of each other, and the laminated article can be used for various applications.

Examples of the non-fluorine-containing polymer are, for instance, polyester, polyamide, polyphenylene sulfide, acrylic polymer, vinyl acetate polymer, polyolefin, vinyl chloride polymer, polycarbonate, styrene polymer, polyurethane, ABS, polyimide, polyamide imide, PEEK, PES, polysulfone, PPO, polyaramide, polyacetal, polyether imide, silicone resin, epoxy resin, phenolic resin, amino resin, unsaturated polyester, cellophane, and the like.

Among them, ① a polymer material having, in its molecule, a functional group or polar group which is reactive or compatible with a carbonate group is preferred from the viewpoint of adhesion to the fluorine-containing adhesive material of the present invention. Examples of the preferred polymer are those having a functional group such as hydroxyl, carboxyl, a carboxylic salt group, an ester group, a carbonate group, amino, amide, imide, mercapto, thiolate, sulfonic acid group, sulfonate group and epoxy. ② A polymer material having high heat resistance is preferred because among polymers other than fluorine-containing polymers, the polymer material stands at a high molding temperature of the fluorine-containing resin, maintains heat resistance of the whole laminated article and can give a laminated article having both of excellent characteristics of the fluorine-containing polymer and features of other polymer material. ③ It is preferable that the non-fluorine-containing polymer is a thermoplastic resin from the points that adhering to the fluorine-containing adhesive material of the present invention and molding can be carried out at the same time and that melt-molding of multi-layers is possible. Particularly a thermoplastic resin having a crystalline melting point of not more than 270° C., further not more than 230° C. is preferred from a point that particularly excellent adhesion is exhibited at thermo-melting adhesion.

Examples of the preferred polymer material are polyamide, polyester, polyphenylene sulfide, polycarbonate, polyamide imide, PEEK, PES, polysulfone, PPO, polyether imide, polyacetal, and the like. Among them, particularly preferable are polyamide, polyester and polycarbonate since those polymers themselves are excellent in mechanical properties and further are required to give excellent chemical resistance, solvent resistance, solvent impermeability, weather resistance, stain-proofing property and optical properties (low refractive index) by laminating to a fluorine-containing resin.

To the adhesive side of the laminated article 2 of the present invention comprising the fluorine-containing adhesive (A-3) and organic material (D-1) can be laminated a fluorine-containing polymer having no functional group.

Namely the obtained laminated article comprises:
(A-5) the fluorine-containing adhesive,
(B-3) a fluorine-containing polymer having no functional group, and
(D-2) an organic material,
in which the adhesive (A-5) forms an adhesive layer between the polymer (B-3) and the organic material (D-2). The obtained laminated article can be, provided with the excellent characteristics of the fluorine-containing polymer more effectively.

In that case, it is preferable from the viewpoint of adhesion that the fluorine-containing adhesive (A-5) used as the adhesive layer of the three-layered laminated article 2 is one which is similar to the fluorine-containing polymer (B-3) of the outermost layer and has carboxyl or a caboxylic salt group.

Examples of the preferred laminated article are:
i) a laminated article comprising:
(A-5) fluorine-containing adhesive comprising the above-mentioned copolymer (I),
(B-3) ETFE, and
(D-2) organic material,
ii) a laminated article comprising:
(A-5) fluorine-containing adhesive comprising the above-mentioned copolymer (II), (III) or (IV),
(B-3) polymer selected from PVdF or VdF copolymers, and
(D-2) organic material, and
iii) a laminated article comprising:
(A-5) fluorine-containing adhesive comprising the above-mentioned copolymer (V),
(B-3) polymer comprising 75 to 100% by mole of tetrafluoroethylene and 0 to 25% by mole of monomer represented by the formula (6), and
(D-2) organic material.

In the laminated article of the present invention comprising the fluorine-containing adhesive (A-3) and organic material (D-1), it is possible to optionally add, to each layer, proper reinforcing agent, filler, stabilizer, ultraviolet ray absorber, pigment and other additives in the range not lowering adhesive property and other characteristics of the fluorine-containing polymer. The addition of those additives can make it possible to improve thermal stability, surface hardness, abrasion resistance, weather resistance, electrostatic charge, etc.

The method for producing the laminated article of the present invention is optionally selected depending on kind and form of the fluorine-containing adhesive, kind and shape of the inorganic material, and kind and shape of the organic material.

Examples of the methods which can be adopted are, for instance, a method for making a fluorine-containing adhesive film by using a fluorine-containing adhesive and then laminating the film to an inorganic or organic material by thermal activation by heating as mentioned above, a method for applying, to an inorganic or organic material, a fluorine-containing adhesive in the form of an aqueous dispersion, organic solvent dispersion, organic solvent soluble material, powder, etc. and then heating for thermal activation, an insert molding method, a co-extrusion method in case of laminating the fluorine-containing adhesive of the present invention and a melt-moldable thermoplastic polymer, and the like method.

By those methods, the laminated article of the present invention can be formed into a hose, pipe, tube, sheet, seal, gasket, packing, film, tank, roller, bottle, vessel, etc.

By the way, polyamide has high strength, high elasticity and excellent processability, and has been used widely for a hose, tube, pipe, etc. On the other hand, polyamide has excellent oil resistance, but is poor in resistance to an alcoholic solvent. Particularly when gasoline containing lower alcohol is used, its oil resistance (gasohol resistance) is lowered, and volumetric swelling and fuel penetration increase, which causes deterioration of material such as lowering of strength.

Therefore there arose a demand that polyamide and fluorine-containing polymer are laminated to improve gasohol resistance and used for a tube for fuel pipe, and various studies have been made. For example, there are proposals of using compositions comprising polyamide and ETFE as an adhesive layer to obtain a laminated tube of polyamide and ETFE through co-extrusion (JP-A-5-193082, JP-A-9-131833). However since those adhesive layer materials are compositions comprising polyamide and ETFE, those compositions are insufficient in heat resistance, chemical resistance and solvent resistance. Also since polyamide is not adhered to the adhesive layer by a reaction, etc. but by an anchor effect, its adhesion is affected by morphology of the adhesive layer composition and varies depending on extrusion molding conditions, environmental change in temperature during use, etc.

The fluorine-containing adhesive of the present invention is one which can adhere particularly strongly to polyamide and provide a laminated article free from the above-mentioned problems.

Therefore a laminated tube produced by molding a laminated article comprising polyamide and the fluorine-containing adhesive of the present invention into a tube can be used effectively as a tube for a fuel pipe and for chemicals.

Examples of the preferred laminated tube produced by using polyamide are as follows.

i) A laminated tube produced by molding, into a tube, a laminated article comprising:
  (A-5) a layer of a fluorine-containing adhesive material comprising the above-mentioned polymer (I) and
  (D-2) a polyamide layer,
  in which the layer (A-5) forms an inner layer.

ii) A laminated tube produced by molding, into a tube, a laminated article comprising:
  (A-5) a layer of a fluorine-containing adhesive material comprising the above-mentioned copolymer (I),
  (B-3) a ETFE layer and
  (D-2) a polyamide layer,
  in which the ETFE layer (B-3) forms an innermost layer.

iii) A laminated tube produced by molding, into a tube, a laminated article comprising:
  (A-5) a layer of a fluorine-containing adhesive material comprising the above-mentioned copolymer (II) and
  (D-2) a polyamide layer,
  in which the layer (A-5) forms an inner layer.

iv) A laminated tube produced by molding, into a tube, a laminated article comprising:
  (A-5) a layer of a fluorine-containing adhesive material comprising the above-mentioned copolymer (II),
  (B-3) a PVdF or VdF copolymer layer and
  (D-2) a polyamide layer,
  in which the PVdF or VdF copolymer layer (B-3) forms an innermost layer.

v) A laminated tube produced by molding, into a tube, a laminated article comprising:
  (D-2) a polyamide layer,
  (A-5) a layer of a fluorine-containing adhesive material comprising the above-mentioned copolymer (I) or (II), and
  (D-2) a polyamide layer,
  in which the layer (A-5) is provided as an intermediate layer between the two polyamide layers (D-2).

A filler, reinforcing agent and additives similar to those mentioned above can be added to each layer of the laminated article in the range not lowering intended characteristics of each layer. Particularly in case of uses for a fuel pipe and a tube for chemicals, it is preferable that a filler imparting electric conductivity is added to the inner layer of fluorine-containing polymer ((A-5) or (B-3)).

The laminated article of the present invention in the form of tube can be formed into necessary forms by post-processing. For example, necessary parts such as connector are mounted thereon, bending is carried out to form into L- or U-shape, or forming into corrugated shape is carried out.

The method for producing the laminated article 2 of the present invention is optionally selected depending on kind and form of the fluorine-containing adhesive and kind and shape of the organic material.

Examples of the methods which can be adopted are, for instance, a method for making a fluorine-containing adhesive film by using a fluorine-containing adhesive material and then laminating the film to an organic material by thermal activation by heating as mentioned above, a method for applying, to an organic material, a fluorine-containing adhesive material in the form of an aqueous dispersion, organic solvent dispersion, organic solvent soluble material, powder, etc. and then heating for thermal activation, an insert molding method, a co-extrusion method in case of laminating the fluorine-containing adhesive material of the present invention and a melt-moldable thermoplastic polymer, and the like method.

By those methods, the laminated article of the present invention can be formed into a hose, pipe, tube, sheet, seal, gasket, packing, film, tank, roller, bottle, vessel, etc.

Further the present invention relates to a method for producing a laminated molded article characterized by extruding and molding a fluorine-containing adhesive (A) having a carbonate group and an organic material (D) together at a molding temperature, namely at a temperature where a resin temperature at molding exceeds the crystalline melting points or glass transition temperatures of the respective adhesive and organic material. Namely the method is preferable from the viewpoint of excellent productivity and good adhering performance since adhesion of the adhesive (A) and organic material (D) and molding into a desired shape can be achieved continuously at the same time by simultaneous melt-molding.

In the preparation process of the present invention, it is preferable that either of the fluorine-containing adhesive (A) and organic material (D) is selected from thermoplastic resins having a crystalline melting point or glass transition temperature of not more than 270° C., further not more than 230° C. from the viewpoint of good intercoat adhesion between them.

Further it is preferable that a molding temperature, namely a resin temperature at molding is regulated to not more than 300° C., further not more than 280° C. from the viewpoint of good intercoat adhesion between (A) and (D) and appearance of a molded article.

Too low molding temperature (resin temperature) results in insufficient melting of both of the fluorine-containing adhesive material (A) and organic material (D), and thereby adhesion between (A) and (D) cannot be attained sufficiently and lowering of appearance such as rough surface of a molded article occurs.

Further too high molding temperature is not preferable because adhesion failure and separation between (A) and (D) occur and lowering of appearance such as roughening due to foaming and coloration arises on the surface of a molded article and the interface between (A) and (D).

The present inventors have found that a molded article having strong intercoat adhesion between the fluorine-containing adhesive material (A) and the thermoplastic resin (D) and excellent appearance and quality can be produced with good productivity by molding the material (A) and the resin (D) which have a crystalline melting point of not more than 230° C., at a molding temperature of not more than 280° C. and exceeding the respective crystalline melting points through simultaneous melt-extrusion.

EXAMPLE

The present invention is then explained by means of preparation examples and examples, but the present invention is not limited to those examples.

Preparation Example 1
(Synthesis of ETFE Having Carboxyl)

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of octafluorocyclobutane (C-318).

Then 3.0 g of perfluoro-(9,9-dihydro-2,5-bistrifluoromethyl-3,6-dioxa-8-nonenoic acid) (formula (7)):

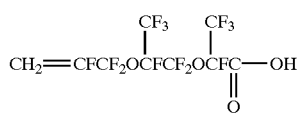

(7)

and 5.7 g of perfluoro(1,1,5-trihydro-1-pentene) were fed into the autoclave with pressurized nitrogen gas, and a temperature inside the system was maintained at 35° C.

Pressurized tetrafluoroethylene/ethylene (97:3% by mole) mixture gas pre-mixed was introduced into the autoclave with stirring so that the inside pressure of the autoclave became 9.0 kgf/cm²G. Then 16 g of a 50% methanol solution of di-n-propyl peroxydicarbonate was fed with pressurized nitrogen to initiate the reaction.

Since the pressure lowered with the advance of the polymerization reaction, at the time when the pressure lowered down to 8.5 kgf/cm²G, it was increased again to 9.0 kgf/cm²G by introducing tetrafluoroethylene/ethylene (67:33% by mole) mixture gas obtained by pre-mixing, and the decreasing and increasing of the pressure were repeated.

With continuing supply of tetrafluoroethylene/ethylene (67:33% by mole) mixture gas, every time when about 25 g of tetrafluoroethylene/ethylene mixture gas was consumed after starting of the polymerization, 1.1 g of the fluorine-containing ethylenic monomer having carboxyl (compound represented by the formula (7)) and 0.9 g of perfluoro(1,1,5-trihydro-1-pentene) were introduced ten times under pressure to continue the polymerization. When about 250 g of tetrafluoroethylene/ethylene was consumed after starting of the polymerization, the supplying thereof was terminated. The autoclave was cooled and the un-reacted monomer and C-318 were released.

The obtained polymer was washed with water, rinsed with methanol and then vacuum-dried to give 200 g of a white solid (powder). The composition of the obtained copolymer was TFE/ethylene/perfluoro(1,1,5-trihydro-1-pentene)/(Fluorine-containing ethylenic monomer having carboxyl and represented by the formula (7))=64.7/33.1/1.3/0.9% by mole according to ¹⁹F-NMR analysis. In infrared spectrum, characteristic absorption of:

was observed at 1,780 cm⁻¹ and characteristic absorption of —OH was observed at 2,800 to 3,400 cm⁻¹ and 3,532 cm⁻¹. According to DSC analysis, Tm was 220° C., and according to DTGA analysis (in the air), a decomposition starting temperature was 246° C. and 1% reduction thermal decomposition temperature Td was 330° C. A melt flow rate measured under conditions of preheating at 230° C. for five minutes at a load of 5 kgf/cm² by using Koka-type flow tester and nozzles of 2 mm diameter×8 mm length was 3.2 g/10 min.

Preparation Example 2
(Synthesis of ETFE Having Methyl Ester Group)

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of octafluorocyclobutane (C-318).

Then 3.1 g of perfluoro-(9,9-dihydro-2,5-bistrifluoromethyl-3,6-dioxa-8-nonenoic acid)methyl (formula (8)):

(8)

and 5.7 g of perfluoro(1,1,5-trihydro-1-pentene) were fed into the autoclave with pressurized nitrogen gas, and a temperature inside the system was maintained at 35°0 C.

Pressurized tetrafluoroethylene/ethylene (97:3% by mole) mixture gas pre-mixed was introduced into the autoclave with stirring so that the inside pressure of the autoclave became 9.0 kgf/cm²G. Then 16 g of a 50% methanol solution of di-n-propyl peroxydicarbonate was fed with pressurized nitrogen to initiate the reaction.

Since the pressure lowered with the advance of the polymerization reaction, at the time when the pressure lowered down to 8.5 kgf/cm²G, it was increased again to 9.0 kgf/cm²G by introducing tetrafluoroethylene/ethylene (65:35% by mole) mixture gas obtained by pre-mixing, and the decreasing and increasing of the pressure were repeated.

With continuing supply of tetrafluoroethylene/ethylene (65:35% by mole) mixture gas, every time when about 22 g of tetrafluoroethylene/ethylene mixture gas was consumed after starting of the polymerization, 1.0 g of the fluorine-containing ethylenic monomer having methyl ester group (compound represented by the formula (8)) and 0.9 g of perfluoro(1,1,5-trihydro-1-pentene) were introduced ten times under pressure to continue the polymerization. When about 210 g of tetrafluoroethylene/ethylene was consumed after starting of the polymerization, the supplying thereof was terminated. The autoclave was cooled and the un-reacted monomer and C-318 were released.

The obtained polymer was washed with water, rinsed with methanol and then vacuum-dried to give 184 g of a white solid (powder). The composition of the obtained copolymer was TFE/ethylene/perfluoro(1,1,5-trihydro-1-pentene)/(Fluorine-containing ethylenic monomer having methyl ester group and represented by the formula (8))=64.7/33.0/1.5/0.8% by mole according to 19F-NMR analysis. In infrared spectrum, characteristic absorption of:

was observed at 1,780 cm$^{-1}$. According to DSC analysis, Tm was 215° C., and according to DTGA analysis (in the air), a decomposition starting temperature was 285° C. and 1% reduction thermal decomposition temperature Td was 359° C. A melt flow rate measured under conditions of preheating at 297° C. for five minutes at a load of 5 kgf/cm$^2$ by using Koka-type flow tester and nozzles of 2 mm diameter×8 mm length was 60 g/10 min.

Preparation Example 3
(Synthesis of ETFE Having Carboxyl by Hydrolysis of ETFE Having Methyl Ester Group)

A 1-liter round bottom flask equipped with a stirrer, reflux tube and thermometer and made of glass was charged with 20 g of the polymer obtained in Preparation Example 2 and 600 ml of methanol, followed by stirring. Then 200 ml of sodium hydroxide solution, 5 mole/liter, was added and the mixture was heated with stirring to refluxing state. Thus reaction was continued for six hours. After completion of the reaction, an obtained product was cooled to normal temperature, neutralized with dilute sulfuric acid and washed with water to give a white powder. The powder was again returned to the reaction vessel, and 200 ml of acetone and 800 ml of dilute sulfuric acid of 1 mole/liter were added. With stirring, heating was carried out to refluxing state. Thus reaction was continued for six hours. After completion of the reaction, an obtained product was cooled to normal temperature, washed with water, rinsed with methanol and then vacuum-dried to give 20 g of a white solid (powder).

In infrared spectrum, characteristic absorption of:

was observed at 1,780 cm$^{-1}$ and characteristic absorption of —OH was observed at 2,800 to 3,400 cm$^{-1}$. According to DSC analysis, Tm was 216° C., and according to DTGA analysis (in the air), a decomposition starting temperature was 270° C. and 1% reduction thermal decomposition temperature Td was 330° C. A melt flow rate measured under conditions of preheating at 230° C. for five minutes at a load of 5 kgf/cm$^2$ by using Koka-type flow tester and nozzles of 2 mm diameter×8 mm length was 3.5 g/10 min.

Preparation Example 4
(Synthesis of ETFE Having no Functional Group)

Synthesis was carried out in the same manner as in Preparation Example 1 except that perfluoro-(9,9-dihydro-2,5-bistrifluoromethyl-3,6-dioxa-8-nonenoic acid) (compound represented by the formula (7)) was not used, and thus 166 g of a white powder of ETFE having no functional group was obtained.

The obtained white powder (whole amount) and 180 ml of pure water were put in a 500 ml stainless steel tank, and 14 g of 28% aqueous ammonia was added thereto, followed by heating at 80° C. for five hours with stirring. A powder in the tank was taken out, washed with water and dried to give 165 g of a powder.

An obtained ETFE was analyzed in the same manner as in Preparation Example 2 and the results were as follows.

TFE/ethylene/perfluoro(1,1,5-trihydro-1-pentene) 64.7/33.5/1.8% by mole
Tm=226° C.
Td=368° C. (1% weight reduction in the air)
Melt flow rate: 14 g/10 min (at 297° C. at a load of 5 kgf/cm$^2$)

Preparation Example 5
(Synthesis of PVdF Having Carboxyl)

A 3-liter autoclave made of SUS and equipped with a stirrer, valve, pressure gauge and thermometer was charged with 1,500 ml of pure water and 1.5 g of ammonium perfluorooctanoate. After replacing with nitrogen gas sufficiently, the autoclave was kept vacuum.

Then 17.8 g of perfluoro-(9,9-dihydro-2,5-bistrifluoromethyl-3,6-dioxa-8-nonenoic acid) (compound of the formula (7)) and 3.0 g of ethyl acetate were fed into the autoclave with pressurized nitrogen gas, and a temperature inside the system was maintained at 60° C.

Pressurized vinylidene fluoride gas (VdF) was introduced into the autoclave with stirring so that the inside pressure of the autoclave became 30 kgf/cm$^2$G. Then a solution prepared by dissolving 0.6 g of ammonium persulfate in 5.0 g of water was fed with pressurized nitrogen to initiate the reaction.

Since the pressure lowered with the advance of the polymerization reaction, at the time when the pressure lowered down to 29 kgf/cm 2G, it was increased again to 30 kgf/cm$^2$G by introducing vinylidene fluoride gas, and the decreasing and increasing of the pressure were repeated.

With continuing supply of vinylidene fluoride, every time when about 75 g of vinylidene fluoride gas was consumed after starting of the polymerization, 8.5 g of the fluorine-containing ethylenic monomer having carboxyl (compound represented by the formula (7)) was introduced six times (51 g in total) under pressure to continue the polymerization. When 450 g of vinylidene fluoride was consumed after starting of the polymerization, the supplying thereof was terminated. The autoclave was cooled and the un-reacted monomer was released to give 2,006 g of semi-transparent aqueous dispersion. A concentration of polymer in the obtained aqueous dispersion was 23.3% and a particle size determined through dynamic light scattering method was 61.5 nm.

The obtained dispersion was coagulated by freezing and the precipitated polymer was rinsed and then dried to give 440 g of a white solid. The composition of the obtained polymer was VdF/(Fluorine-containing ethylenic monomer having carboxyl and represented by the formula (7))=98.7/1.3% by mole according to $^{19}$F-NMR.

In infrared spectrum, characteristic absorption of:

was observed at 1,775 cm$^{-1}$ and characteristic absorption of —OH was observed at 2,800 to 3,400 cm$^{-1}$.

According to DSC analysis, Tm was 167° C., and according to DTGA analysis (in the air), a decomposition starting temperature was 251° C. and 1% reduction thermal decomposition temperature Td was 317° C. According to GPC analysis employing DMF as a solvent, a number average molecular weight was 154,000 and a weight average molecular weight was 316,000.

Preparation Example 6
(Synthesis of PVdF Having Carboxyl)

A 3-liter autoclave made of SUS stainless steel and equipped with a stirrer, valve, pressure gauge and thermometer was charged with 1,500 ml of pure water and 1.5 g of ammonium perfluorooctanoate.

After replacing with nitrogen gas sufficiently, the autoclave was kept vacuum.

Then 51.4 g of perfluoro-(9,9-dihydro-2,5-bistrifluoromethyl-3,6-dioxa-8-nonenoic acid) (compound of the formula (7)) and 3.0 g of ethyl acetate were fed into the autoclave with pressurized nitrogen gas, and a temperature inside the system was maintained at 60° C.

Pressurized vinylidene fluoride gas (VdF) was introduced into the autoclave with stirring so that the inside pressure of the autoclave became 30 kgf/cm$^2$G. Then a solution prepared by dissolving 0.6 g of ammonium persulfate in 5.0 g of water was fed with pressurized nitrogen to initiate the reaction.

Since the pressure lowered with the advance of the polymerization reaction, at the time when the pressure lowered down to 29 kgf/cm$^2$G, it was increased again to 30 kgf/cm$^2$G by introducing vinylidene fluoride gas, and the decreasing and increasing of the pressure were repeated.

With continuing supply of vinylidene fluoride, every time when about 75 g of vinylidene fluoride gas was consumed after starting of the polymerization, 30 g of the fluorine-containing ethylenic monomer having carboxyl (compound represented by the formula (7)) was introduced eight times (240 g in total) under pressure to continue the polymerization. When 600 g of vinylidene fluoride was consumed after starting of the polymerization, the supplying thereof was terminated. The autoclave was cooled and the un-reacted monomer was released to give 2,407 g of a semi-transparent aqueous dispersion. A concentration of polymer in the obtained aqueous dispersion was 35.1% and a particle size determined through dynamic light scattering method was 78.2 nm.

The obtained dispersion was coagulated by freezing and the precipitated polymer was rinsed and then dried to give 830 g of a white solid. The composition of the obtained polymer was VdF/(Fluorine-containing ethylenic monomer having carboxyl and represented by the formula (7))=98.7/6.3% by mole according to $^{19}$F-NMR.

In infrared spectrum, characteristic absorption of:

was observed at 1,775 cm$^{-1}$ and characteristic absorption of —OH was observed at 2,800 to 3,400 cm$^{-1}$.

According to DSC analysis, Tm was 164° C., and according to DTGA analysis (in the air), a decomposition starting temperature was 232° C. and 1% reduction thermal decomposition temperature Td was 294° C. According to GPC analysis employing DMF as a solvent, a number average molecular weight was 183,000 and a weight average molecular weight was 419,000.

Preparation Example 7
(Synthesis of PVdF Having no Functional Group)

The same SUS stainless steel autoclave as in Preparation Example 5 was charged with 1,500 ml of pure water, 1.5 g of ammonium perfluorooctanoate and 1.5 g of ethyl acetate, and after replacing with nitrogen, the inside of the system was evacuated and kept at 60° C. Pressurized vinylidene fluoride gas (VdF) was introduced into the autoclave with stirring so that the inside pressure of the autoclave became 30 kgf/cm 2G. Then a solution prepared by dissolving 0.6 g of ammonium persulfate in 5.0 g of water was fed with pressurized nitrogen to initiate the reaction.

Vinylidene fluoride was supplied as reaction advances in the same manner as in Preparation Example 5, and when about 150 g of vinylidene fluoride was consumed after starting of the polymerization, the supplying thereof was terminated. The autoclave was cooled and the un-reacted monomer was released to give 1,640 g of a semi-transparent aqueous dispersion. A concentration of polymer in the obtained aqueous dispersion was 9.4% and a particle size was 196 nm.

The same treatment was carried out as in Preparation Example 5 to give 145 g of a white solid. The obtained white solid was analyzed in the similar manner and the results were as follows.

Tm: 173° C.

1% reduction thermal decomposition temperature: 370° C. (in the air)

Molecular weight by GPC (solvent: DMF):
Number average molecular weight: 232,000
Weight average molecular weight: 457,000.

Preparation Example 8
(Synthesis of PVdF Having zinc Carboxylate)

PVdF having zinc carboxylate was prepared in the manner mentioned below by using PVdF having carboxyl and obtained in Preparation Example 6 and zinc acetate.

After 70 g of PVdF having carboxyl and obtained in Preparation Example 6 was melted at 10 rpm for one minute in Brabender mixer set at 230° C., 6.3 g of zinc acetate (Zn(CH$_3$COO)$_2$.2H$_2$O) was added, followed by kneading at 40 rpm for three minutes. Then the mixture was taken out. A percentage of neutralization by zinc was determined by IR analysis in the manner mentioned below.

Namely when functional group is zinc salt instead of carboxyl, absorption of carbonyl:

in IR spectrum shifts from 1,775 cm$^{-1}$ to 1,685 cm$^{-1}$.

A percentage of neutralization was calculated by assuming absorptivities at 1,685 cm$^{-1}$ and 1,775 cm$^{-1}$ to be $A_{1685}$ and $A_{1775}$, respectively and substituting them for the equation:

Percentage of neutralization (%)=$A_{1685}/(A_{1685}+A_{1775})\times 100$

The percentage of neutralization was 94%.

Preparation Example 9
(Production of Film of ETFE Having Carboxyl)

A metal die of 100 mm diameter was charged with a white powder obtained in Preparation Example 1 and set on a press machine of 230° C., followed by preheating for 40 minutes and then compression-molding at 79 kgf/cm$^2$ for 30 seconds. Thus a 0.5 mm thick film was obtained.

Preparation Example 10
(Production of Film of ETFE Having Carboxyl by Hydrolysis of Methyl Ester Group)

The same procedures as in Preparation Example 9 were repeated except that the white solid obtained in Preparation Example 3 was used, to give a 0.5 mm thick film.

Preparation Example 11
(Production of Film of ETFE Having no Functional Group)

The same procedures as in Preparation Example 9 were repeated except that the white solid obtained in Preparation Example 4 was used, to give a 0.5 mm thick film.

Preparation Example 12
(Production of Polyamide Film)

A metal die of 100 mm diameter was charged with polyamide (UBE NYLON 123020JSX8 available from Ube Industries, Ltd.) and set on a press machine of 200° C., followed by preheating for 30 minutes and then compression-molding at 45 kgf/cm$^2$ for 30 seconds. Thus a 0.5 mm thick film was obtained.

Preparation Example 13
(Production of Film of PVdF Having Carboxyl)

A metal die of 100 mm diameter was charged with a white solid prepared in Preparation Example 5 and set on a press machine of 200° C., followed by preheating for 30 minutes and then compression-molding at 45 kgf/cm$^2$ for 30 seconds. Thus a 0.5 mm thick film of PVdF having carboxyl was obtained.

Preparation Example 14
(Production of Film of PVdF Having Carboxyl)

Compression molding was carried out in the same manner as in Preparation Example 13 except that the PVdF powder having carboxyl and prepared in Preparation Example 6 was used instead of the white solid obtained in Preparation Example 5, to give a 0.5 mm thick PVdF film.

Preparation Example 15
(Production of Film of PVdF Having Carboxylate)

Compression molding was carried out in the same manner as in Preparation Example 13 except that the PVdF having zinc carboxylate and prepared in Preparation Example 7 was used instead of the white powder obtained in Preparation Example 5, to give a 0.5 mm thick PVdF film having carboxylate.

Preparation Example 16
(Production of Film of PVdF Having no Functional Group)

Compression molding was carried out in the same manner as in Preparation Example 13 except that the PVdF powder prepared in Preparation Example 8 was used instead of the white powder obtained in Preparation Example 5, to give a 0.5 mm thick PVdF film having no functional group.

Example 1
(Adhesive Property of ETFE Film Having Carboxyl and Polyamide Film)
(Production of Test Piece for Peeling Test)

Figure 2:
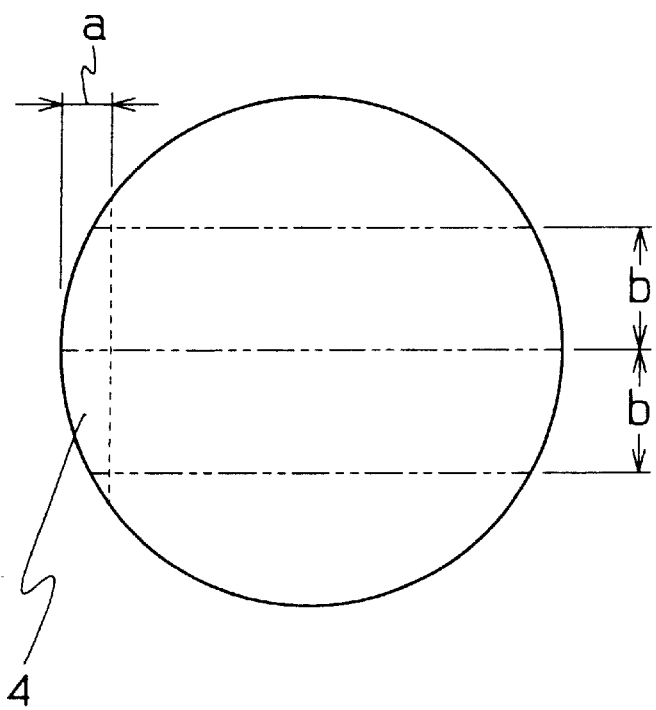
FIG. 2 is a diagrammatic top view of the test piece made in Example 1 of the present invention.

FIG. 1 shows a diagrammatic view for explaining a method for making a laminated article produced for making a test piece for peeling test. As shown in FIG. 1, the ETFE film 1 having carboxyl and obtained in Preparation Example 9 and the polyamide film 2 obtained in Preparation Example 12 were overlapped each other, and a spacer (aluminum foil) 3 of 0.1 mm thick was inserted between them in the range of a width a (10 mm) (shown in FIG. 2). Then they were put in a metal die of 100 mm diameter and set on a press machine of 230° C., followed by preheating for 20 minutes and pressing at 45 kgf/cm$^2$ for 30 seconds to give a laminated article. FIG. 2 shows a diagrammatic top view of the obtained laminated article. The obtained laminated article was cut to a width of b (25 mm) and the spacer was removed to give a test piece for peeling test. In FIG. 2, numeral 4 represents a spacer portion.

(Peeling Test)

Figure 3:
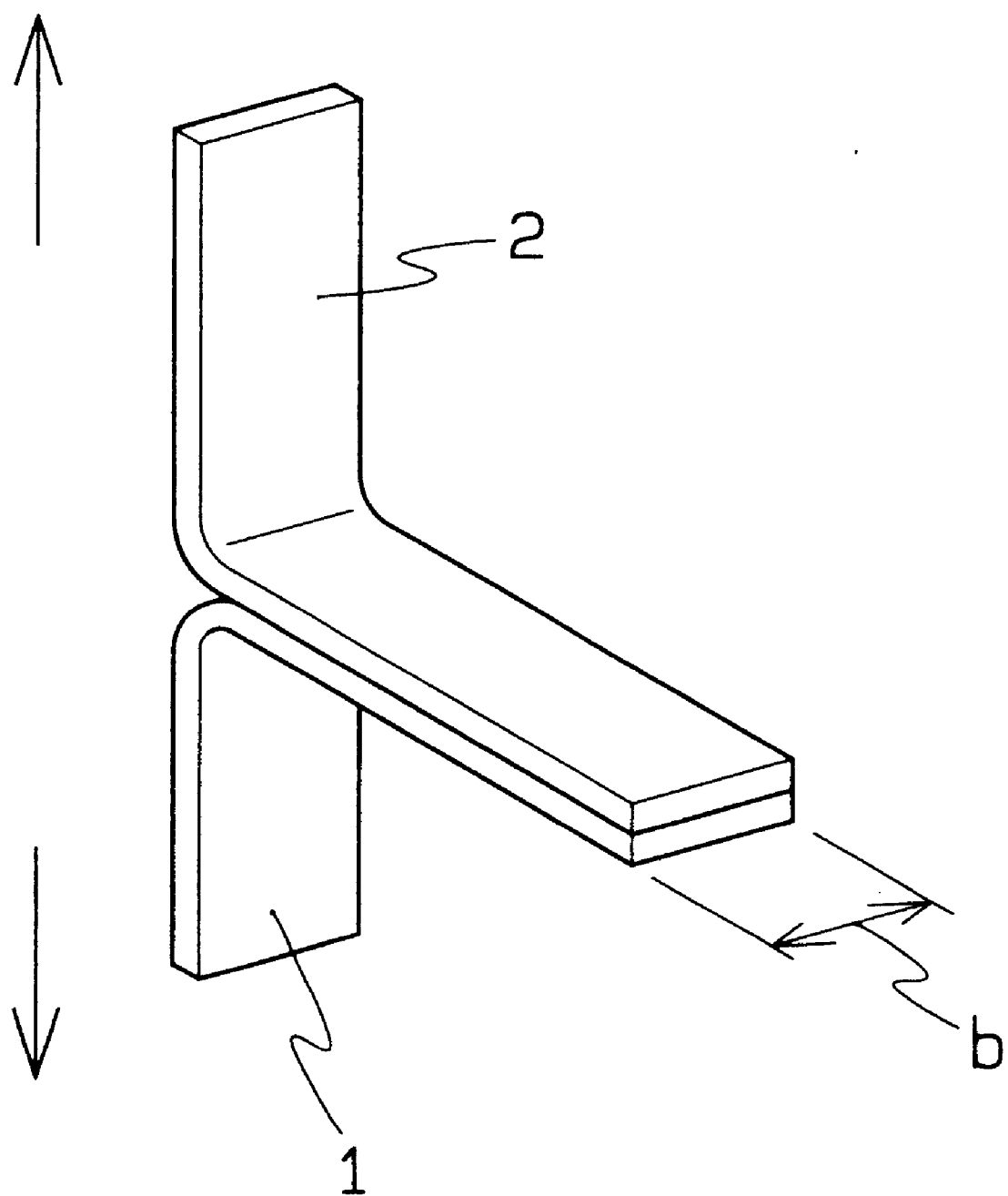
FIG. 3 is a diagrammatic perspective view of the test piece subjected to the peeling test in Example 1 of the present invention.

FIG. 3 is a diagrammatic perspective view of a test piece subjected to the peeling test. A peeling strength was measured by using the above-mentioned test piece and TENSILON Univeral Tester available from Orientec Corporation according to T-type peeling test method of JIS K6854-1977 at room temperature at a cross head speed of 50 mm/min. The results of the test are shown by maximum peeling strength (kgf/25 mm) and integral average peeling strength (kgf/25 mm). The results are shown in Table 1. In FIG. 3, numeral 1 represents a ETFE film having carboxyl and numeral 2 represents a polyamide film.

Example 2
(Adhesive Property of Polyamide Film and ETFE Film Having Carboxyl Obtained by Hydrolysis of Methyl Ester Group)
(Production of Test Piece for Peeling Test)

A test piece was made and peeling test was carried out in the same manner as in Example 1 except that the ETFE film having carboxyl and obtained in Preparation Example 10 was used instead of the film obtained in preparation Example 9.

(Peeling Test)

T-type peeling test was carried out in the same manner as in Example 1. However the ETFE film was broken before occurrence of peeling. The results are shown in Table 1. Though the results of measurement are shown by maximum peeling strength (kgf/25 mm), actually peeling cannot occur unless the strength is larger than the maximum peeling strength shown in Table 1.

Comparative Example 1
(Adhesive Property of ETFE Film Having no Functional Group and Polyamide Film)

A test piece was made and T-type peeling test was carried out in the same manner as in Example 1 except that the ETFE film having no functional group and obtained in preparation Example 11 was used instead of the film obtained in Preparation Example 9. No adhesion was exhibited, and spontaneous peeling occurred.

TABLE 1

| | Ex. 1 | Ex. 2 | Com. Ex. 1 |
| --- | --- | --- | --- |
| Kind of fluorine-containing adhesive | Prep. Ex. 9 | Prep. Ex. 10 | Prep. Ex. 11 |
| Maximum peeling strength (kgf/25 mm) | 4.2 | 7.1 | 0 |
| Integral average peeling strength (kgf/25 mm) | 3.1 | Film broken | 0 |

Examples 3 to 5
(Adhesion Test of PVdF Film Having Carboxyl to Metal)

Adhesion test of PVdF films having carboxyl (films of Preparation Examples 13 to 15) to a 0.5 mm thick degreased pure aluminum plate was carried out in the manner mentioned below. The results are shown in Table 2.
(Production of Test Piece for Peeling Test)

Figure 4:
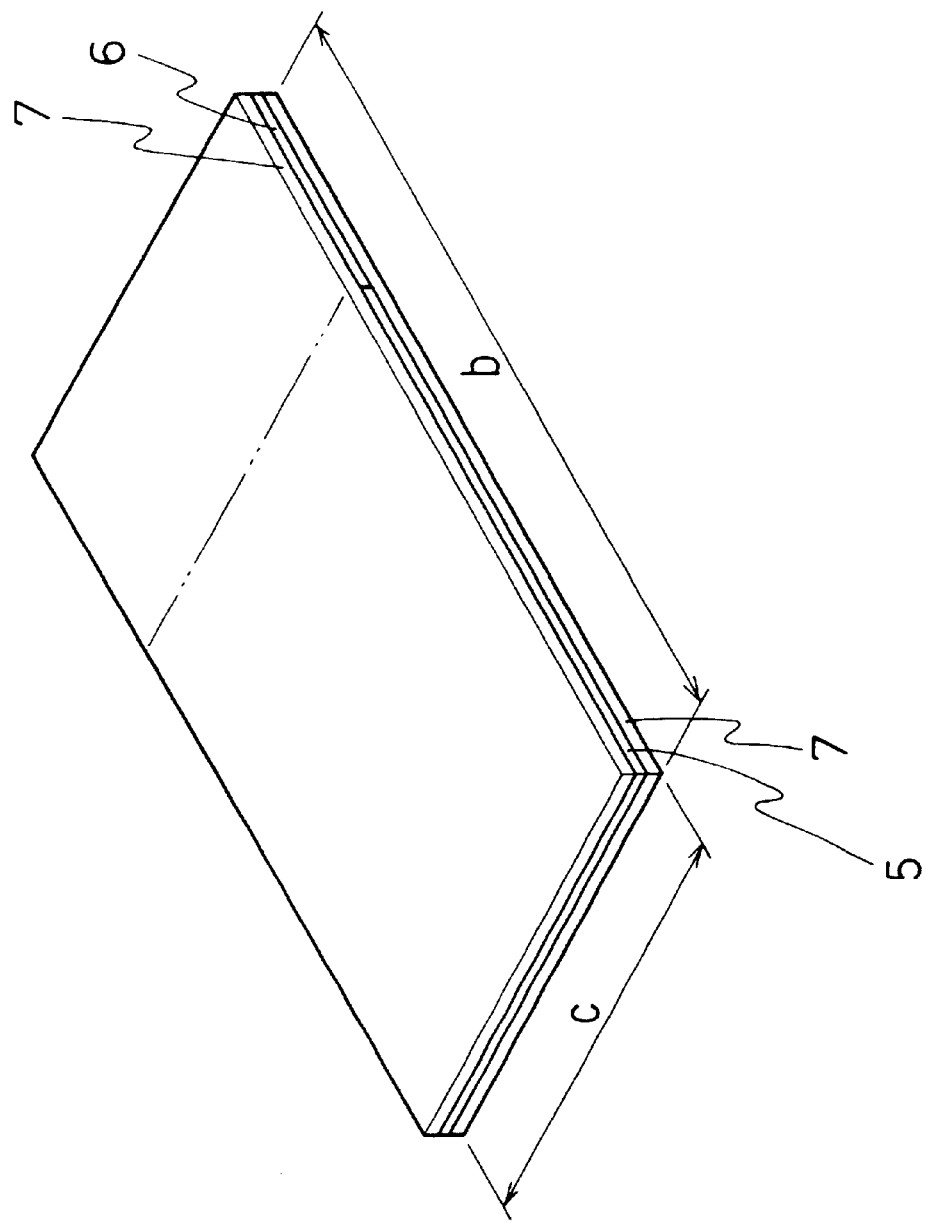
FIG. 4 is a diagrammatic perspective view of the laminated article for making a test piece used in the peeling test in Example 3 of the present invention.

FIG. 4 is a diagrammatic perspective view of a laminated article made to obtain a test piece for peeling test. As shown in Table 4, the PVdF film having functional group as an adhesive layer 5 which was obtained in Preparation Examples 13 to 15 and a 0.1 mm thick spacer 6 (aluminum foil) were put between the two metal plates 7, and set on a press machine of 200° C., followed by preheating (20 minutes) and pressing at 50 kg/cm² for one minute to give a laminated article having a length c (150 mm) and a width d (70 mm).

Figure 5:
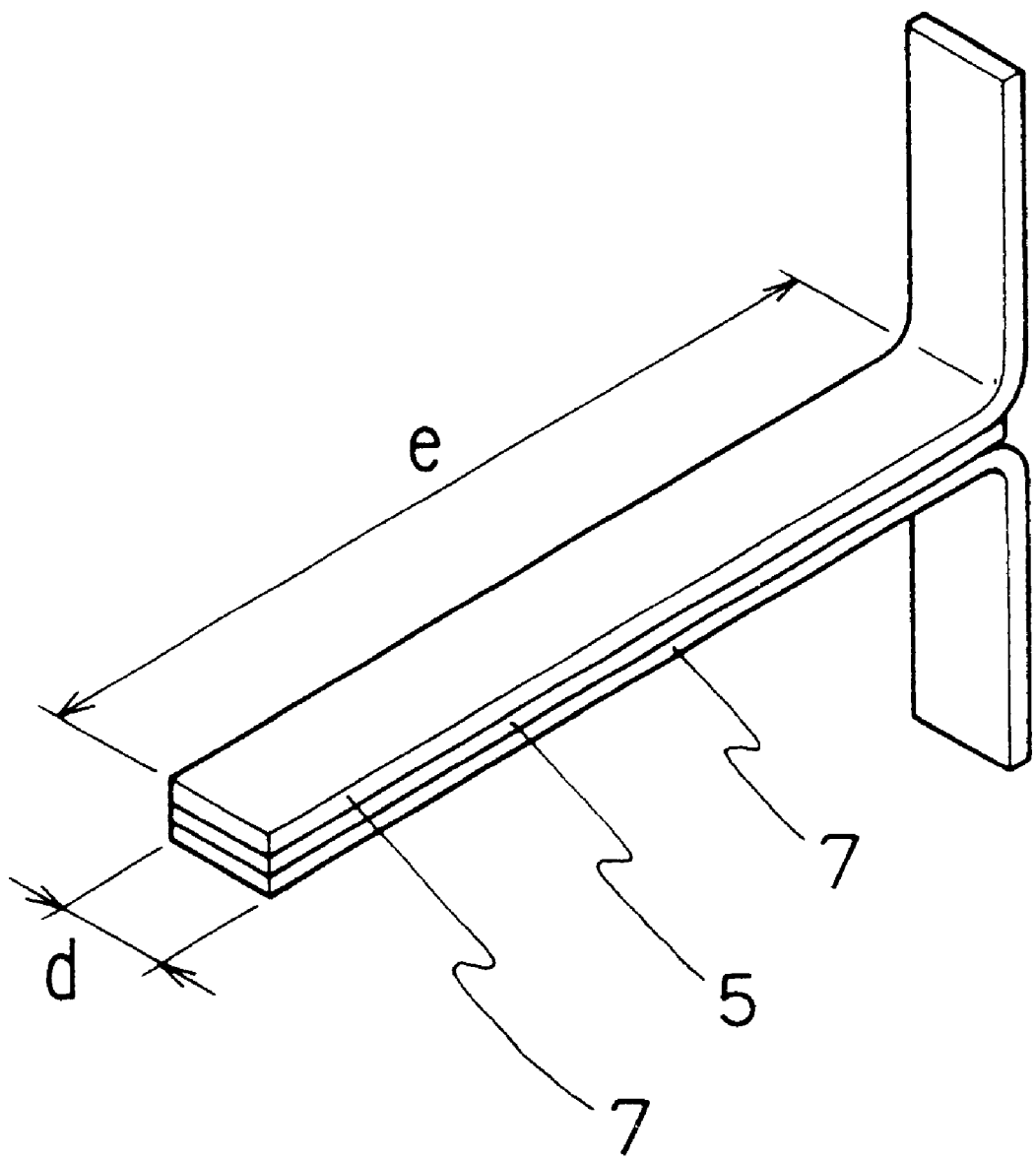
FIG. 5 is a diagrammatic cross-sectional view of a test piece for the peeling test in Example 3 of the present invention.

Any of thickness of the adhesive layers 5 of the obtained laminated articles was 0.1 mm. Further the laminated articles were cut to a width d (25 mm), and the spacer portion was bent in the form of T at a point of distance e (100 mm) from one end of the cut plate to give a test piece for peeling test. FIG. 5 is a diagrammatic perspective view of the obtained test piece for peeling test. In FIG. 5, numeral 5 represents an adhesive layer and numeral 7 represents a metal plate.

(Peeling Test)

Measurement was carried out at room temperature at a cross head speed of 50 mm/min by using TENSILON Universal Tester available from Orientec Corporation according to T-type peeling test method of JIS K6854-1977. The results of the measurement are represented by an adhesive strength (kgf/25 mm) obtained by an integral average. The results are shown in Table 2.

Comparative Example 2
(Adhesion Test of PVdF Film Having no Functional Group to Metal)

Production of a test piece and peeling test were carried out in the same manner as in Example 3 except that the PVdF film having no functional group and obtained in Preparation Example 16 was used instead of the PVdF film having carboxyl and obtained in Preparation Example 13. The results are shown in Table 2.

TABLE 2

|  | Ex. 3 | Ex. 4 | Ex. 5 | Com. Ex. 2 |
|---|---|---|---|---|
| Kind of fluorine-containing adhesive | Prep. Ex. 13 | Prep. Ex. 14 | Prep. Ex. 15 | Prep. Ex. 16 |
| Integral average peeling strength (kgf/25 mm) | 3.2 | 4.0 | 2.3 | 0 |

Comparative Example 3
(Adhesion Test of ETFE Film Having Carboxyl to Polyamide)

Production of a test piece and T-type peeling test were carried out in the same manner as in Example 1 except that the ETFE film having carboxyl and obtained in Preparation Example 9 and the polyamide film obtained in Preparation Example 12 were set on a press machine of 285° C.

An interface between the polyamide and the ETFE film were adhered partly, but foaming and partial separation occurred and an integral average peeling strength was 0.8 kgf/25 mm.

Preparation Example 17
(Synthesis of Carboxyl-Containing ETFE Having a High Melting Point)

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 4.9 g of perfluoro-(9,9-dihydro-2,5-bistrifluoromethyl-3,6-dioxa-8-nonenoic acid) (compound of the formula (7)) was fed into the autoclave with pressurized nitrogen gas, and a temperature inside the system was maintained at 35° C.

Pressurized tetrafluoroethylene/ethylene (82:18% by mole) mixture gas pre-mixed was introduced into the autoclave with stirring so that the inside pressure of the autoclave became 9.0 kgf/cm²G. Then 12 g of a 50% methanol solution of di-n-propyl peroxydicarbonate was fed with pressurized nitrogen to initiate the reaction.

Since the pressure lowered with the advance of the polymerization reaction, at the time when the pressure lowered down to 8.5 kgf/cm²G, it was increased again to 9.0 kgf/cm²G by introducing tetrafluoroethylene/ethylene (52:48% by mole) mixture gas obtained by pre-mixing, and the decreasing and increasing of the pressure were repeated.

With continuing supply of tetrafluoroethylene/ethylene (52:48% by mole) mixture gas, every time when about 15 g of tetrafluoroethylene/ethylene mixture gas was consumed after starting of the polymerization, 0.9 g of the fluorine-containing ethylenic monomer having carboxyl (compound represented by the formula (7)) was introduced ten times under pressure to continue the polymerization. When about 150 g of tetrafluoroethylene/ethylene was consumed after starting of the polymerization, the supplying thereof was terminated. The autoclave was cooled and the un-reacted monomer and R-114 were released.

The obtained polymer was washed with water, rinsed with methanol and then vacuum-dried to give 162 g of a white solid (powder). The composition of the obtained copolymer was TFE/ethylene/(Fluorine-containing ethylenic monomer having carboxyl and represented by the formula (7))=51.5/47.5/1.0% by mole according to ¹⁹F-NMR analysis. In infrared spectrum, characteristic absorption of:

was observed at 1,780 cm⁻¹ and characteristic absorption of —OH was observed at 2,800 to 3,400 cm⁻¹ and 3,532 cm⁻¹. According to DSC analysis, Tm was 272° C., and according to DTGA analysis (in the air), a decomposition starting temperature was 274° C. and 1% reduction thermal decomposition temperature Td was 313° C. A melt flow rate measured under conditions of preheating at 300° C. for five minutes at a load of 5 kgf/cm² by using Koka-type flow tester and nozzles of 2 mm diameter×8 mm length was 33.8 g/10 min.

Preparation Example 18
(Production of Carboxyl-Containing ETFE Film Having a High Melting Point)

Compression molding was carried out in the same manner as in Preparation Example 9 except that the white powder obtained in Preparation Example 17 was used and a press machine was set at 278° C., to give a 0.5 mm thick film.

Comparative Example 4
(Adhesion Test of Carboxyl-Containing ETFE Film Having a High Melting Point to Polyamide)

Production of a test piece and T-type peeling test were carried out in the same manner as in Example 1 except that the carboxyl-containing ETFE film having a high melting point and obtained in Preparation Example 18 was used instead of the film obtained in Preparation Example 9. No adhesion was exhibited at all, and spontaneous peeling occurred.

Comparative Example 5
(Adhesion Test of Carboxyl-Containing ETFE Film Having a High Melting Point to Polyamide)

Production of a test piece and T-type peeling test were carried out in the same manner as in Comparative Example 3 except that the carboxyl-containing ETFE film having a high melting point and obtained in Preparation Example 18 was used instead of the film obtained in Preparation Example 9. An interface between the polyamide and the ETFE film were adhered partly, but foaming and partial separation occurred and an integral average peeling strength was 0.5 kgf/25 mm.

Preparation Example 19
(Production of Pellets of ETFE Having Carboxyl)

A powder of polymer synthesized in the same manner as in Preparation Example 1 was put in a two screw extruder (LABOPLASTOMIL available from Toyo Seiki Kabushiki Kaisha) and extruded at 230° to 240° C. to give pellets.

Preparation Example 20
(Production of Pellets of ETFE Having no Functional Group)

Pellets were produced in the same manner as in Preparation Example 19 except that a powder of ETFE having no functional group and obtained in Preparation Example 4 was used instead of a polymer powder of Preparation Example 1.

Example 6
(Production of Multi-Layered Tape Comprising ETFE Having Carboxyl and Polyamide)

A multi-layered tube (two layers) comprising an outer layer of polyamide and an inner layer of ETFE and having an outside diameter of about 8 mm and an inner diameter of about 6 mm was produced from the polyamide pellets (same one as in Preparation Example 12) and the pellets of ETFE having carboxyl and obtained in Preparation Example 19 through simultaneous extrusion of two kinds/two layers by using an extruder equipped with a multi-manifold die under the conditions shown in Table 3. Evaluations of adhesion and appearance of inner layer surface were made by using the obtained multi-layered tube.

TABLE 3

|  | Ex. 6 | Com. Ex. 6 | Com. Ex. 7 |
| --- | --- | --- | --- |
| Resin of inner layer | Prep. Ex. 19 | Prep. Ex. 20 | Prep. Ex. 19 |
| Resin of outer layer | Polyamide (Prep. Ex. 12) | Polyamide (Prep. Ex. 12) | Polyamide (Prep. Ex. 12) |
| Inner layer |  |  |  |
| Cylinder temperature (° C.) | 260–261 | 260–261 | 285–295 |
| Resin temperature (° C.) | 274 | 275 | 315 |
| Outer layer |  |  |  |
| Cylinder temperature (° C.) | 210–235 | 210–235 | 210–235 |
| Resin temperature (° C.) | 243 | 243 | 245 |
| Outer layer die temperature (° C.) | 260 | 260 | 260 |
| Tube pull-out speed (m/min) | 9.5 | 9.5 | 9.5 |

(Adhesion Test)

A 5 mm wide test piece was cut from the tube and 180° peeling test was carried out at a speed of 50 mm/min by using TENSILON Universal Tester to measure a maximum intercoat adhesive strength.

(Appearance of Inner Layer Surface)

The surface of the inner layer and interface between the inner layer and the outer layer of the obtained multi-layered tube were observed with naked eyes. When inner wall surface and adhered interface were smooth, it was evaluated as "◯".

The results are shown in Table 4.

Comparative Example 6

Production of a tube and tests were carried out in the same manner as in Example 6 under the conditions shown in Table 3 except that molding into a multi-layered tube was carried out by using the pellets obtained in Preparation Example 20 instead of the pellets obtained in Preparation Example 19. The results are shown in Table 4.

Comparative Example 7

Production of a tube and tests were carried out in the same manner as in Example 6 except that the molding conditions (resin temperature, cylinder temperature, etc.) were changed as shown in Table 4.

TABLE 4

|  | Ex. 6 | Com. Ex. 6 | Com. Ex. 7 |
| --- | --- | --- | --- |
| Resin of outer layer | Prep. Ex. 19 | Prep. Ex. 20 | Prep. Ex. 19 |
| Resin of inner layer | Polyamide (Prep. Ex. 12) | Polyamide (Prep. Ex. 12) | Polyamide (Prep. Ex. 12) |
| Dimensions of tube |  |  |  |
| Outside diameter (mm) | 7.9 | 8.0 | 8.0 |
| Thickness of inner layer (mm) | 0.18 | 0.19 | 0.20 |
| Thickness of outer layer (mm) | 0.77 | 0.76 | 0.80 |
| Adhesive strength (N/cm) | 15.4 | 4.2 | 6.0 |
| Appearance of inner layer surface | ◯ | ◯ | X (Foaming and partial peeling occurred) |

INDUSTRIAL APPLICABILITY

The fluorine-containing adhesive of the present invention is excellent in chemical resistance, solvent resistance, weather resistance, non-sticking property, stain-proofing property, mold-processability and adhering workability, and further exhibits strong direct adhesion to substrates of metal, glass and thermoplastic resin other than fluorine-containing resin particularly at thermo-melting adhesion. The fluorine-containing adhesive can be used suitably for an adhesive film, a laminated article and a laminated tube.

What is claimed is:

1. A fluorine-containing adhesive comprising a fluorine-containing ethylenic polymer (A) having a functional group, said fluorine-containing ethylenic polymer (A) having a crystalline melting point of glass transition temperature of not more then 270° C. and is prepared by copolymerizing:
   (a) 0.05 to 30% by mole of at least one of fluorine-containing ethylenic monomers having at least one functional group selected from the group consisting of carboxyl and a carboxylic salt group, and
   (b) 70 to 99.95% by mole of at least one of fluorine-containing ethylenic monomers which do not have said functional group and is copolymerizable with said component (a), wherein the fluorine-containing ethylenic monomer (b) which does not have said functional group is a monomer mixture of 40 to 80% by mole of tetrafluoroethylene or chlorotrifluoroethylene, 20 to 60% by mole of ethylene and 0 to 15% by mole of a monomer copolymerizable with those monomers, a monomer mixture comprising 70 to 99% by mole of vinylidene fluoride and 1 to 30% by mole of tetrafluoroethylene, a monomer mixture comprising 50 to 99% by mole of vinylidene fluoride, 0 to 30% by mole of tetrafluoroethylene and 1 to 20% by mole of chlorotrifluoroethylene, a monomer mixture comprising 60 to 99% by mole of vinylidene fluoride, 0 to 30% by mole of tetrafluoroethylene and 1 to 10% by mole of hexafluoropropylene, or vinylidene fluoride.

2. The fluorine-containing adhesive of claim 1, wherein the fluorine-containing ethylenic monomer (b) which does not have said functional group is a monomer mixture of 40 to 80% by mole of tetrafluoroethylene or chlorotrifluoroethylene, 20 to 60% by mole of ethylene and 0 to 15% by mole of a monomer copolymerizable with those monomers.

3. The fluorine-containing adhesive of claim 1, wherein the fluorine-containing ethylenic monomer (b) which does not have said functional group is vinylidene fluoride.

4. The fluorine-containing adhesive of claim 1, wherein the fluorine-containing ethylenic monomer (b) which does not have said functional group is a monomer mixture comprising 70 to 99% by mole of vinylidene fluoride and 1 to 30% by mole of tetrafluoroethylene, a monomer mixture comprising 50 to 99% by mole of vinylidene fluoride, 0 to 30% by mole of tetrafluoroethylene and 1 to 20% by mole of chlorotrifluoroethylene or a monomer mixture comprising 60 to 99% by mole of vinylidene fluoride, 0 to 30% by mole of tetrafluoroethylene and 1 to 10% by mole of hexafluoropropylene.

5. The fluorine-containing adhesive of claim 1, wherein the fluorine-containing ethylenic monomer (a) having functional group is at least one of monomers represented by the formula (1):

$$CX_2=CX^1-R_f-COOY \qquad (1)$$

wherein X and $X^1$ are the same or different and each is hydrogen atom or fluorine atom, Y is hydrogen atom, $NH_4$ or metal atom selected from elements of I, II, III, IVa and VIII groups, $R_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

6. The fluorine-containing adhesive of claim 1, wherein the fluorine-containing ethylenic monomer (a) having functional group is at least one of monomers represented by the formula (1) in which X is hydrogen atom.

7. A molded article produced by melt-molding the fluorine-containing adhesive of claim 1.

8. A fluorine-containing adhesive film produced by melt molding the fluorine-containing adhesive of claim 1.

9. A laminated article comprising:

(A-2) a layer of the fluorine-containing adhesive of claim 1 and (C-1) a layer of an inorganic material.

10. A laminated article comprising:

(A-3) a layer of the fluorine-containing adhesive of claim 1 and (D-1) a layer of an organic material.

11. The laminated article of claim 9 wherein the inorganic material (C-1) is a metallic material or a non-metallic inorganic material.

12. The laminated article of claim 11 wherein the inorganic material (C-1) is a glass material.

13. The laminated article of claim 10 wherein the organic material (D-1) is a non-fluorine-containing material.

14. The laminated article of claim 13 wherein the organic material (D-1) is a thermoplastic resin.

15. The laminated article of claim 14 the organic material (D-1) is polyamide.

16. A laminated article comprising:

(A-3) a layer of the fluorine-containing adhesive of claim 2 and (D-1) a layer of an organic material,
wherein the organic material (D-1) is polyamide.

* * * * *